US007869072B2

(12) United States Patent
Gong

(10) Patent No.: US 7,869,072 B2
(45) Date of Patent: Jan. 11, 2011

(54) PRINTER DEVICE

(75) Inventor: Wei Dong Gong, Ami-machi (JP)

(73) Assignee: Riso Kagaku Corporation, Tokyo (JP)

( * ) Notice: Subject to any disclaimer, the term of this patent is extended or adjusted under 35 U.S.C. 154(b) by 1440 days.

(21) Appl. No.: 11/074,340

(22) Filed: Mar. 7, 2005

(65) Prior Publication Data

US 2005/0213148 A1 Sep. 29, 2005

(30) Foreign Application Priority Data

Mar. 9, 2004 (JP) ............................. 2004-065212

(51) Int. Cl.
G06F 3/12 (2006.01)
(52) U.S. Cl. .................... 358/1.15; 358/1.13; 358/1.14; 358/1.17
(58) Field of Classification Search .................. 358/1.4, 358/1.9, 1.13, 1.14, 1.15, 1.16, 1.17
See application file for complete search history.

(56) References Cited

U.S. PATENT DOCUMENTS 5,299,296 A * 3/1994 Padalino et al. ............ 358/1.13
6,600,569 B1 * 7/2003 Osada et al. ................ 358/1.12
6,614,544 B2 * 9/2003 Tokura ....................... 358/1.15

FOREIGN PATENT DOCUMENTS

| JP | 2000-085211 | 3/2000 |
| JP | 2000-099292 | 4/2000 |
| JP | 2002-301840 | 10/2002 |
| JP | 2004-066787 | 3/2004 |

* cited by examiner

Primary Examiner—Edward L Coles
Assistant Examiner—Vu B Hang
(74) Attorney, Agent, or Firm—Matthew K. Ryan; Brian M. McGuire; Frommer Lawrence & Haug LLP

(57) ABSTRACT

In a printer device, the page analysis controller causes the page analyzer to execute the page analysis processing preferentially on the print type print job data to the storage type print job data out of the print job data waiting for the page analysis processing stored in the page analysis queue, to interrupt, when the print type print job data is received during the page analysis processing on the storage type print job data, the page analysis processing and execute the page analysis processing on the received print type print job data to output the page analyzed print job data to the expansion circuit, and to resume the interrupted page analysis processing on the storage type print job data after the page analysis processing on the received print type print job data.

14 Claims, 9 Drawing Sheets

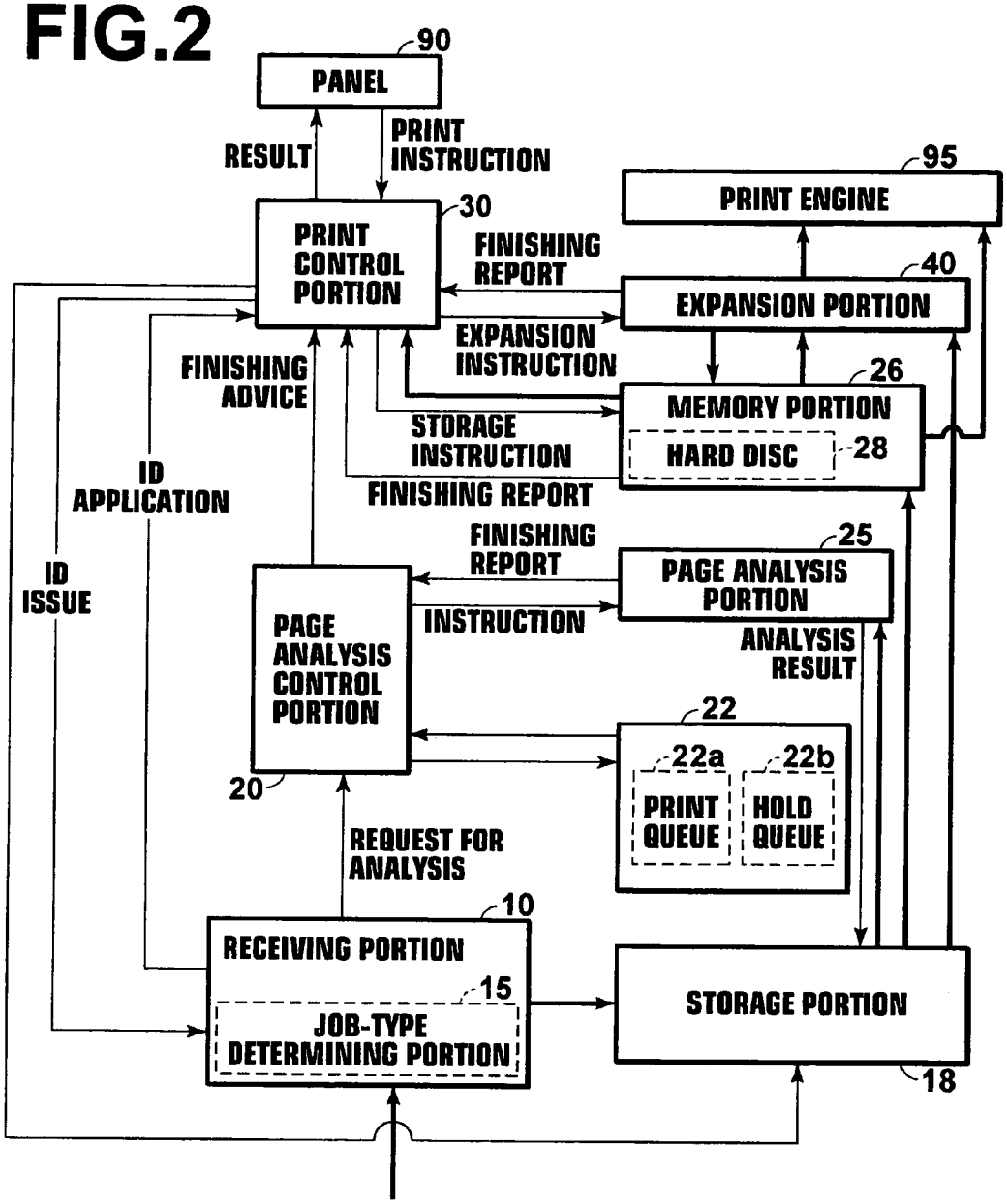

PRINTER DEVICE

BACKGROUND OF THE INVENTION

1. Field of the Invention

This invention relates to a printer device, and more particularly to a printer device which is provided with a function of storing print job data.

2. Description of the Related Art

Recently, with development of the network technology and increase in the processing speed of printers, it is becoming normal that a plurality of print job data output units (e.g., computers) connected to each other through a network hold one printer device in common. In the case where the printer device itself held in common has an interface for the network (e.g., an Ethernet interface), it is possible to arrange the system so that the printer device is directly connected to the network and effects printing by receiving print job data directly from the print job data output units, whereas in the case where the printer device itself held in common does not have an interface for the network, it is possible to arrange the system so that the printer device is connected to one of the print job data output units on the network by way of an interface such as a parallel interface or a USB interface and effects printing by receiving print job data directly from said one of the print job data output units, and at the same time, effects printing by receiving print job data from the other print job data output units on the network by way of the one of the print job data output units. Since the printer device effects printing by receiving print job data from each of the print job data output units on the network independently of whether the printer device is directly connected to the network, a plurality of print job data output units are said to hold one printer device in common through a network in either cases.

The printer device, when broadly divided, comprises an intermediate processing portion which carries out intermediate processing on the print job data and a print engine portion which makes printings according to data (print data) in a predetermined format obtained by transforming the print job data by the intermediate processing. The intermediate processing comprises page analysis processing of the print job data and expansion processing of the print job data. The page analysis processing includes, for instance, extraction of abstract information of the transmitted print job data such as the number of pages, identification of position of each page and extraction of information unique to each page (e.g., information on image processing for only a specified page or on the size of the paper different from other pages), and the expansion processing includes expansion of print job data on the basis of the result of the page analysis processing into print data (e.g., image data) for processing by the print engine.

In the system where one printer device is held by a plurality of print job data output units by way of a network, the printer device executes page analysis processing, expansion processing and printing in this order for each print job data basically in the order of receipt. In the printer device, the print job data including a print instruction as well as the print job data not including a print instruction but including a storage instruction can be processed. There is a printer device which executes page analysis processing, expansion processing and printing in this order for the print job data including a print instruction whereas can store the print job data in a storage device such as a hard disc inherent to the printer device for the print job data not including a print instruction but including a storage instruction (the print job data solely including a storage instruction). In such a printer device (will be referred to as an "on-demand printer device", hereinbelow.), the user can issue an instruction of printing the stored print job data by way of the control panel inherent to the printer device. The printer device calls the print job data instructed to print from the storage device upon receipt the print instruction and outputs the print job data to the print engine after necessary processing, and the print engine makes printings according to the processed print job data. The print job data including a print instruction can be further classified into print job data solely including a print instruction and that including both a print instruction and a storage instruction. For the print job data including both a print instruction and a storage instruction, the printer device executes the intermediate processing and printing to obtain printings and at the same time stores the print job data as in the print job data solely including a storage instruction.

The on-demand printer device either stores the print job data including a print instruction as it is received without carrying out any intermediate processing on the print job data or stores the print job data including a print instruction after carrying out intermediate processing on the print job data. When the print job data is stored without carrying out intermediate processing, since the storage processing has been ended substantially simultaneously with receipt of the print job data, the print job data including a print instruction can be processed at once and printings can be obtained at once even if a print job data including a print instruction is received immediately after receipt of the print job data solely including a storage instruction. On the other hand, when instructed to print the stored print job data by way of, for instance, the control panel, a long time is required since it is necessary to carry out the intermediate processing. The printer device of such a structure is produced from the view that the print job data including a print instruction should be processed at high speed to obtain printings while the print job data solely including a storage instruction may be stored at any time and need not be processed so quickly as the print job data including a print instruction.

On the other hand when the print job data including a print instruction is stored after the intermediate processing, the stored print job data can be immediately output to the print engine when instructed to print the stored print job data by way of, for instance, the control panel, since the stored print job data has undergone the intermediate processing, and it is unnecessary to carry out the intermediate processing on the stored print job data. However, when the print job data including a print instruction is received during intermediate processing on the print job data solely including a storage instruction, the print job data including a print instruction cannot be processed until the intermediate processing on the print job data solely including a storage instruction is ended, and accordingly, processing on the print job data including a print instruction is slow.

Further, in the forms where the print job data including a print instruction is stored after the intermediate processing, there has been known a form where the print job data which has undergone only a part of the intermediate processing is stored in place of storing the print job data which has undergone the whole of the intermediate processing. This approach stands between the form where the print job data is stored with no intermediate processing carried out on the print job data and the form where the print job data is stored with only a part of the intermediate processing carried out on the print job data and can avoids the demerits of both the forms but sacrifices the merits of both the forms.

Japanese Unexamined Patent Publication No. 2002-301840 proposes a printer device where, in order to enjoy the merits of both the forms while avoiding the demerits of both the forms, the print job data including a storage instruction is stored after the intermediate processing (or a part of the intermediate processing) while when the print job data including a print instruction is received during intermediate processing on the print job data solely including a storage instruction, the intermediate processing on the print job data solely including a storage instruction is once interrupted to execute the intermediate processing on the received print job data including a print instruction and is resumed after the intermediate processing on the received print job data including a print instruction. In the proposed printer device, since the print job data including a print instruction is processed preferentially to the print job data solely including a storage instruction and the print job data including a storage instruction is finally stored in the form where the intermediate processing has been wholly or partly carried out thereon, printing of the print job data including a print instruction as well as the stored print job data can be made at high speed.

The page analysis processing and the expansion processing forming print job data are conventionally carried out in a time sequence for one piece of print job data. That is, the expansion processing is executed on print data the intermediate processing on which has been finished. However, it is possible to execute the page analysis processing on the next piece of print job data by the portion of the printer device bearing thereon the page analysis processing in parallel to the expansion processing executed on a given piece of print job data by the portion of the printer device bearing thereon the expansion processing. This can be realized by providing one printer device with two CPUs (so-called a dual CPU) and causing the page analysis processing and the expansion processing to be executed by different CPUs or by multitask technology employing one CPU. The multitask is a technology where a plurality of tasks are executed in sequence at fine cycles, and broadly classified into a multitask of priority system where a longer CPU time is allotted to a task of higher priority and a multitask of round robin system where the CPU time is uniformly allotted to the tasks.

However, the user who has transferred print job data solely including a storage instruction sometimes wants to know, for instance, whether the print job data is correctly received by the printer device. Usually, the printer device displays the abstract of the received print job data such as the number of pages thereof on a display such as the control panel after the page analysis processing is ended to permit the user to check. However, the printer device proposed in Japanese Unexamined Patent Publication No. 2002-301840 gives rise to a problem that the abstract of the print job data solely including a storage instruction is displayed slow since in the printer device proposed in Japanese Unexamined Patent Publication No. 2002-301840, when the print job data including a print instruction is received during intermediate processing on the print job data solely including a storage instruction, the intermediate processing on the print job data solely including a storage instruction is once interrupted to execute the intermediate processing on the received print job data including a print instruction and is resumed after the intermediate processing (including up to the expansion processing) on the received print job data including a print instruction, the interrupted intermediate processing on the print job data solely including a storage instruction is not resumed until the intermediate processing on the received print job data including a print instruction is wholly ended.

In the case of the printer device where the page analysis processing and the expansion processing can be executed in parallel, even when the next print job data is received during the expansion processing on the print job data the page analysis processing on which has been finished, the page analysis processing can be executed on the next print job data. In such a printer device, by arranging the system so that the page analysis processing is executed on a plurality of pieces of print job data basically in the order of receipt, while for the processing waiting print job data stored in a temporary memory such as a queue for the page analysis processing, the page analysis processing is preferentially executed on the print job data including a print instruction, processing from the receipt of the print job data including a print instruction up to the printing of the print job data can be quickly executed and at the same time, since the page analysis processing can be executed on the next print job data during the expansion processing on a given piece of print job data (the page analysis processing on which has been finished), the abstract of the print job data solely including a storage instruction can be quickly displayed. However this approach gives rise to a problem that, for instance, when the print job data including a print instruction is received during the page analysis processing on the print job data solely including a storage instruction, processing on the print job data including a print instruction must wait the end of the page analysis processing on the print job data solely including a storage instruction, which can result in slow processing on the print job data including a print instruction.

SUMMARY OF THE INVENTION

In view of the foregoing observations and description, the primary object of the present invention is to provide a printer device which can preferentially process the print job data including a print instruction so that printings can be quickly obtained on the basis of the print job data including a print instruction and at the same time can quickly display the abstract of the print job data solely including a storage instruction.

In accordance with a first aspect of the present invention, there is provided a first printer device comprising a receiving means which receives a print type print job data including a print instruction and a storage type print job data not including a print instruction but including a storage instruction, a job-type determining means which determines whether the print job data received by the receiving means is the print type print job data or the storage type print job data, a page analysis means which executes page analysis on the print job data to make page analyzed print job data, a page analysis output means which outputs result of the page analysis processing on the storage type print job data, a storage means which stores the page analyzed print job data of the storage type print job data, an expansion control means which causes expansion processing on the page analyzed print job data having a print instruction out of the page analyzed print job data stored by the storage means and on the page analyzed print job data of the print type print job data made by the page analysis means, an expansion means which executes the expansion processing under the control of the expansion control means to obtain print data, a printing generating means which generates printings according to the print data, a page analysis queue which temporarily stores the print job data waiting for the page analysis processing by the page analysis means, and a page analysis control means which controls the page analysis means, wherein the improvement comprises that the page analysis control means causes the page analysis means to execute the page analysis processing preferentially on the print type print job data to the storage type print job data out of the print job data waiting for the page analysis processing stored in the page analysis queue, to interrupt, when the receiving means receives the print type print job data during the page analysis processing on the storage type print job data, the page analysis processing and execute the page analysis processing on the received print type print job data to output the page analyzed print job data to the expansion means, and to resume the interrupted page analysis processing on the storage type print job data after the page analysis processing on the received print type print job data.

The page analysis processing by the page analysis means includes at least processing for obtaining information on the page number of the page to be processed, e.g., a first page, a second page, . . . . The print job data from the print job data output means such as a computer sometimes includes information on the arrangement of the print job data, e.g., the total number of the pages of the print job data, which is transferred prior to data for the first page. In this case, the page number of the page of the print job data can be obtained before the page analysis processing on all the print job data is ended. Accordingly, it is preferred that the page analysis processing include processing of extracting the total number of the pages of the print job data. In the case where information such as the total number of the pages is not included or is not transferred prior to data for the first page, the result of the page analysis as for the number of pages is output only for the pages the page analysis processing on which has been finished. That is, in accordance with the present invention, the total number of the pages can be sometimes obtained before the page analysis processing on all the print job data is ended and cannot be sometimes obtained until the page analysis processing on all the print job data is ended, depending on the form of the print job data. In the printer device according to the present invention, in either of the above cases, the page number of the page the page analysis processing on which has been finished is included in the result of the page analysis processing.

The "page analyzed print job data" means print job data reflecting the result of the page analysis processing, and may be either in the form of the original print job data attached with the result of the page analysis processing (the page analyzed print job data in this case comprises the original print job data and information extracted from the print job data) or in the form of the print job data which is processed to facilitate obtaining the number of pages, e.g., processed to attach a paginating flag at each of the ends of the pages (the page analyzed print job data in this case is in the form different from the form of the original print job data).

The page analysis processing in the present invention is a part of the intermediate processing for obtaining the print data to be output to the printing generating means from the print job data received by the receiving means, and the processing in the intermediate processing other than the processing to be executed by the page analysis means can be executed by the expansion means. In order for the expansion means to execute the corresponding expansion processing on the print job data at high speed, it is preferred that the page analysis processing includes identification of position of each page and extraction of information unique to each page as well as the processing for obtaining the number of pages.

Further, as described above, the page analyzed print job data may comprise the original print job data and the information on the result (e.g., the number of pages) of the page analysis processing or the print job data (e.g., attached with a paginating flag at each of the ends of the pages) transformed in its form by the page analysis processing depending on the form of the page analysis processing to be executed by the page analysis means. When the page analyzed print job data comprises the original print job data and the result of the page analysis processing, both the print job data and the result of the page analysis processing corresponding to the print job data may be output or only the result of the page analysis processing (together with the corresponding ID) may be output while the same IDs are given to the print job data and the result of the page analysis processing corresponding to the print job data and the print job data is stored in a temporary storage means such as a memory so that the portion receiving the result of the page analysis processing reads out the print job data having the same ID as the result of the page analysis processing from the temporary storage means. That is, the page analyzed print job data may be output in any form so long as the receiving portion can finally get the print job data and the result of the page analysis processing.

The page analysis output means is a means which outputs result of the page analysis processing on the storage type print job data, and outputs at least the number of pages of the storage type print job data the page analysis processing by the page analysis means on which has been finished though need not output all the result.

The page analysis output means may be any so long as it can output the result of the page analysis processing so that the result of the page analysis processing can be checked by the user. For example, the page analysis output means may be a display such as a liquid crystal panel built in the printer device or a transmitter which returns the result of the page analysis processing to the print job data output means which has transmitted the corresponding print job data.

Further, the page analysis output means may automatically output the result of the page analysis processing immediately after the page analysis processing by the page analysis means on each page of the storage type print job data is ended. For example, when the user causes, e.g., the liquid crystal panel to display a table of pieces of the page analyzed storage type print job data and designates a piece of print job data the result of the page analysis processing on which the user wants to check, the page analysis output means may output the result of the page analysis processing on the designated piece of print job data on the basis of the page analyzed data thereof. When the page analyzed data comprises the print job data and the number of pages when outputting the result of the page analysis processing on the basis of the page analyzed data, the page analysis output means may directly output the number of pages, and when the page analyzed data differs from the original print job data in form, the page analysis output means may output the number of pages obtained from the page analyzed data. For example, when the page analyzed data includes the paginating flags attached to the original print job data, the page analysis output means may output the number of the paginating flags as the number of pages.

The storage means stores the page analyzed print job data by the use of a storage medium such as a hard disc which can hold the contents of the data even if the power supply thereto is cut.

In the first printer device of the present invention, the intermediate processing for obtaining the print data for outputting the printing generating means from the received print job data is divided into the page analysis processing and the expansion processing which are separately executed by the page analysis means and the expansion means. Accordingly, page analysis processing can be executed on another piece of print job data by the page analysis means during the expansion processing on the page analyzed data of a given piece of print job data. The arrangements of the page analysis means and the expansion means need not be limited to particular arrangements, so long as they can execute the page analysis processing and the expansion processing in parallel. For example, the page analysis means and the expansion means may be provided by separate CPUs, or may be provided by multitasking of one CPU. From the viewpoint of cost and that control of delivery of data between the CPUs is unnecessary, the multitasking of one CPU is preferred.

Further, in the first printer device of the present invention, the expression "to resume the interrupted page analysis processing on the storage type print job data after the page analysis processing on the print type print job data" means either that the interrupted processing is resumed as soon as the page analysis processing on the print type print job data is ended irrespective of whether another piece of print type print job data is received during the page analysis processing on the print type print job data or that the interrupted processing is resumed as soon as the page analysis processing on the print type print job data is ended when another piece of print type print job data is not received during the page analysis processing on the print type print job data while the interrupted processing is resumed after the page analysis processing on the print waiting print type print job data stored in the temporary memory is ended as soon as the page analysis processing on the print type print job data is ended when another piece of print type print job data is received during the page analysis processing on the print type print job data (in this case, the print type print job data received later is temporarily stored in the page analysis queue).

If the expansion means has no current job (the expansion processing on another piece of page processed data) when page analyzed data of print type print job data on which the page analysis processing by the page analysis means has been executed or page analyzed data stored by the storage means is output to the expansion means, the expansion processing is immediately carried out thereon, while if the expansion means has a current job when page analyzed data of print type print job data or page analyzed data stored by the storage means is output to the expansion means, they are temporarily stored in a temporary memory means such as a queue for waiting for the processing by the expansion means and the expansion processing is subsequently carried out thereon. In the following description, "to carry out the expansion processing" means both the case where the expansion processing is immediately carried out on the page analyzed data and the case where the page analyzed data is temporarily stored and the expansion processing is subsequently carried out thereon.

There are sometimes included in the print type print job data both print-only type print job data solely including a print instruction and print/storage type print job data including both the print instruction and the storage instruction. In the first printer device of the present invention, taking into account such a case, it is preferred that the job-type determining means determines whether the print job data received by the receiving means is the print-only type print job data, the print/storage type print job data or the storage type print job data and the storage means stores also the page analyzed data of the print/storage type print job data.

Further, there are sometimes included in the print type print job data both print-only type print job data solely including a print instruction and print/storage type print job data including both the print instruction and the storage instruction. In the first printer device of the present invention, taking into account such a case, it is further preferred that the job-type determining means determines whether the print job data received by the receiving means is the print-only type print job data, the print/storage type print job data or the storage type print job data, the storage means stores also the page analyzed data of the print/storage type print job data, and the expansion control means causes print data stored by the storage means to be output directly to the printing generating means upon issue of a print instruction on the print data.

In the first printer device of the present invention, it is preferred that the expansion control means obtains the print data by causing the expansion means to execute the expansion processing only on the page analyzed data having a first print instruction out of the page analyzed print job data stored by the storage means, and causes the storage means to store the print data and to output the print data directly to the printing generating means upon issue of a print instruction on the print data subsequently stored by the storage means.

In the first printer device of the present invention, it is preferred that the expansion control means causes the expansion means, as soon as the page analysis processing on one page of the print type print job data by the page analysis means is ended, to execute the expansion processing on the page analyzed print job data of the page.

In accordance with a second aspect of the present invention, there is provided a second printer device comprising a receiving means which receives a print type print job data including a print instruction and a storage type print job data not including a print instruction but including a storage instruction, a job-type determining means which determines whether the print job data received by the receiving means is the print type print job data or the storage type print job data, a page analysis means which executes page analysis on the print job data to make page analyzed print job data, a page analysis output means which outputs result of the page analysis processing on the storage type print job data, an expansion control means which causes expansion processing on the page analyzed print job data made by the page analysis means, an expansion means which executes the expansion processing under the control of the expansion control means to obtain print data, a storage means which stores the print data of the storage type print job data obtained by the expansion means, a printing generating means which generates printings according to the print data having a print instruction out of the print data stored by the storage means and the print data of the print type print job data obtained by the expansion means, a page analysis queue which temporarily stores the print job data waiting for the page analysis processing by the page analysis means, and a page analysis control means which controls the page analysis means, wherein the improvement comprises that the page analysis control means causes the page analysis means to execute the page analysis processing preferentially on the print type print job data to the storage type print job data out of the print job data waiting for the page analysis processing stored in the page analysis queue, and to interrupt, when the receiving means receives the print type print job data during the page analysis processing on the storage type print job data, the page analysis processing and to execute the page analysis processing on the received print type print job data to output the page analyzed print job data to the expansion means and to resume the interrupted page analysis processing on the storage type print job data after the page analysis processing on the received print type print job data.

That is, the second printer device of the present invention is the same in structure as the first printer device of the present invention except that the expansion control means executes the expansion processing also on the page analyzed data of the storage type print job data and the storage means stores the print data of the storage type print job data obtained by the expansion means in place of the page analyzed data of the storage type print job data, and the descriptions made on the first printer device are true in the second printer device.

As in the first printer device, in the second printer device, the print type print job data may include the print-only type print job data and the print/storage type print job data, the job-type determining means may determine whether the print job data is the print-only type print job data, the print/storage type print job data or the storage type print job data and the storage means may store also the print data of the print/storage type print job data.

It is preferred that the second printer device of the present invention be further provided with an expansion queue which temporarily stores the page analyzed data waiting for the expansion processing by the expansion means and that the expansion control means cause the expansion means to execute the expansion processing preferentially on the page analyzed data of the print type print job data to that of the storage type print job data out of the page analyzed data waiting for the processing stored in the expansion queue, and to interrupt, when the page analysis means ends the page analysis processing on the print type print job data during the expansion processing by the expansion means on the page analyzed data of the storage type print job data, the expansion processing and to execute the expansion processing on the page analyzed data of the print type print job data the page analysis processing on which is ended to output the print data to the printing generating means and to resume the interrupted expansion processing on the page analyzed data of the storage type print job data after the expansion processing.

It is further preferred that the expansion queue be divided into a second print queue which temporarily stores the page analyzed data of the print type print job data waiting for the processing by the expansion means and a second hold queue which temporarily stores the page analyzed data of the storage type print job data waiting for the processing, and the expansion control means causes the expansion means to execute the expansion processing preferentially on the page analyzed data stored in the second print queue to that stored in the second hold queue.

In the second printer device of the present invention, it is preferred that the expansion control means causes the expansion means, as soon as the page analysis processing on one page of the print type print job data by the page analysis means is ended, to execute the expansion processing on the page analyzed print job data of the page.

In the first and second printer devices of the present invention, it is preferred that the page analysis control means which causes the page analysis means to execute the page analysis processing on the print type print job data preferentially to the storage type print job data when a plurality of pieces of print job data are stored in the page analysis queue which temporarily stores the print job data waiting for the page analysis processing by the page analysis means divides the expansion queue into a first print queue which temporarily stores the print type print job data waiting for the processing and a first hold queue which temporarily stores the storage type print job data waiting for the processing, and causes the page analysis means to execute the page analysis processing preferentially on the print job data stored in the first print queue to that stored in the first hold queue, thereby causing the print type print job data waiting for the processing to be processed preferentially to the storage type print job data.

In this case, the page analysis queue may store the print job data waiting for the processing in any manner so long as the page analysis means can obtain the print job data to process on the basis of the contents stored in the page analysis queue and the manner in which the page analysis queue stores the print job data waiting for the processing need not be limited to directly storing the print job data itself waiting for the processing. For example, an ID number is attached to each of the print job data, the ID numbers are stored in another storage means (e.g., a memory) in linkage with the print job data and the page analysis queue may store only the ID number attached to the print job data in place of directly storing the print job data waiting for the processing. In this case, the page analysis means may subsequently obtain the corresponding print job data from said another storage means on the basis of the ID number stored in the page analysis queue.

This is true when the page analyzed data waiting for the processing is stored by the expansion queue in the second printer device of the present invention.

In the first and second printer devices of the present invention, it is preferred that the page analysis processing by the page analysis means and the expansion processing by the expansion means can be executed in parallel by multitasking and, when the page analysis processing and the expansion processing are to be executed in parallel, the expansion processing be executed in preference to the page analysis processing. That is, in the printer device of the present invention, it is preferred that the page analysis means and the expansion means can execute the page analysis processing and the expansion processing in parallel by a priority system multitasking, and the expansion processing by the expansion means (one task) be higher in priority than the page analysis processing by the page analysis means (another task).

In accordance with the first and second printer devices of the present invention, since the intermediate processing on the print job data is divided into the page analysis processing and the expansion processing, and the page analysis processing and the expansion processing are respectively executed by the page analysis means and the expansion means which can be operated at one time, the page analysis processing on the next print job data can be executed during the expansion processing of a given print type print job data (print job data the page analysis processing on which has been ended). For example, when the page analysis processing is executed on a given print type print job data to obtain page analyzed data of the print type print job data, and storage type print job data is received during the expansion processing by the expansion means on the page analyzed data, the page analysis means can immediately execute the page analysis processing on the received storage type print job data irrespective of whether the expansion processing by the expansion means is ended. Accordingly, the page analysis output means can quickly output result of the page analysis processing on the storage type print job data.

Further, in the printer device of the present invention, the print job data is processed basically in the order of receipt. However, since, for the print job data waiting for the processing in the page analysis queue, the print type print job data is processed preferentially to the storage type print job data, the print type print job data can be quickly processed and the demand that printings can be quickly obtained of the user who has sent the print type print job data can be met.

Further, in the printer device of the present invention, the page analysis control means causes the page analysis means to interrupt, when the print type print job data is received during the page analysis processing on the storage type print job data by the page analysis means, the executing page analysis processing and execute the page analysis processing on the received print type print job data, and to resume the interrupted page analysis processing on the storage type print job data after the page analysis processing on the received print type print job data in order to execute the page analysis processing preferentially on the print type print job data to the storage type print job data. Accordingly, the print type print job data can be preferentially processed and at the same time the interrupted page analysis processing on the storage type print job data can be quickly processed.

When the page analysis queue which temporarily stores the print job data waiting for the processing in the first and second printer devices of the present invention is divided into a first print queue which stores the print type print job data and a first hold queue which stores the storage type print job data, the page analysis means may only process the print job data stored in the first print queue preferentially to the print job data stored in the first hold queue without checking the kind of the print job data stored in the page analysis queue in order to process the print type print job data waiting for the processing preferentially to the storage type print job data waiting for the processing, whereby efficiency can be improved.

When the first printer device of the present invention is arranged so that when a print instruction is issued to the page analyzed data stored by the storage means and printing is once made on the basis of the page analyzed data, the print data obtained in the printing is stored, and at the same time, when a print instruction is subsequently issued to the print job data which has been turned to the print data, the print data is output directly to the printing generating means in place of the page analyzed data, the printing of the stored storage type print job data can be quickly made from the second time.

Further, when the page analysis means and the expansion means can execute the page analysis processing and the expansion processing in parallel by multitasking in the first and second printer devices of the present invention, the cost can be reduced and the control can be simplified. In this case, by employing the priority system as the system of multitasking and making the expansion processing higher in priority than the page analysis processing, the expansion processing can be executed at high speed while the page analysis is being executed.

BRIEF DESCRIPTION OF THE DRAWINGS

FIG. 2 is block diagram showing the structure of the printer employed in the print system A shown in FIG. 1, FIG. 3 is a view showing an example of the screen of the touch panel of the printer shown in FIG. 2.

DESCRIPTION OF THE PREFERRED EMBODIMENTS

Figure 1:
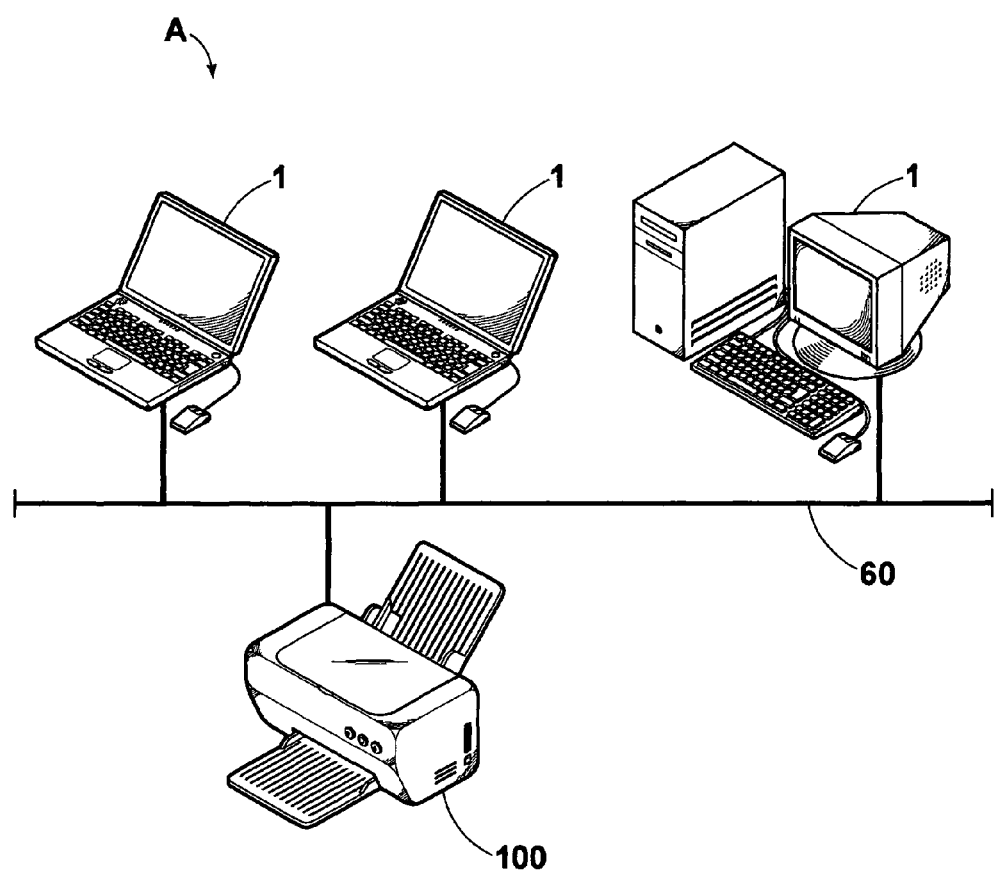
FIG. 1 is a block diagram showing a print system A which is a first embodiment of the present invention.

In FIG. 1, a print system A in accordance with a first embodiment of the present invention comprises a plurality of personal computers 1 and a printer 100 connected to the personal computers 1 by way of a network 60. The printer 100 can deal with print-only type print job data solely including a print instruction, print/storage type print job data including both the print instruction and the storage instruction and storage type print job data solely including a storage instruction, and each of the computers 1 are loaded with a printer driver for the printer 100 and outputs to the printer 100 one of the three types of print job data according to the setting by the user to cause the printer 100 to make print.

FIG. 2 shows the structure of the printer 100 employed in the print system A shown in FIG. 1. As shown in FIG. 2, the printer 100 comprises a receiving portion 10, a storage portion 18, a page analysis control portion 20, an analysis queue 22, a page analysis portion 25, a memory portion 26, a print control portion 30, an expansion portion 40, a panel 90 and a print engine 95. The receiving portion 10 is provided with a job-type determining portion 15 and the memory portion 26 is provided with a hard disc 28. In FIG. 2, the arrows in a thick line represent the flow of data including the print job data and the arrows in a thin line represent the flow of data not including the print job data.

The components of the printer 100 will be described in detail, hereinbelow.

The receiving portion 10 receives the print job data sent from each of the computers 1, determines the type of the received print job data, makes application for a job ID of the received print job data, and issues a request for the page analysis of the received print job data. More particularly, the receiving portion 10 first receives the print job data from each of the computers 1. The job-type determining portion 15 determines whether the received print job data is the print-only type print job data, the print/storage type print job data or the storage type print job data. The receiving portion 10 outputs the result of the determination by the job-type determining portion 15 to the print control portion 30 and makes application for a job ID of the received print job data, and causes the storage portion 18 to store the job ID, issued from the print control portion 30 in response to the application, in linkage with the received print job data, and outputs the job ID to the page analysis control portion 20 and issues a request for the page analysis of the received print job data. Though will be described in detail later, the print control portion 30 issues a job ID according to the type of the print job data in response to the application for a job ID from the receiving portion 10.

The receiving portion 10 makes application for a job ID to the print control portion 30 before issuing a request for the page analysis to the page analysis control portion 20 upon receipt of the print job data. However since application of the job ID and issue of the job ID both can be executed in a very short time, the receiving portion 10 makes application for a job ID of the received print job data, receives the job ID and issues a request for the page analysis to the page analysis control portion 20 substantially simultaneously with receipt of the print job data. The following description will be made on the assumption that the receiving portion 10 receives the print job data and issues a request for the page analysis to the page analysis control portion 20 at the same timing.

The page analysis portion 25 executes the page analysis processing on the print job data under the control of the page analysis control portion 20 to obtain the result of page analysis, and the analysis queue 22 temporarily stores the print job data waiting for the page analysis processing by the page analysis portion 25 (the corresponding job ID in this particular embodiment) and comprises a print queue 22a which temporarily stores the job ID of the print type print job data (the print-only type print job data and the print/storage type print job data) and a hold queue 22b which temporarily stores the job ID of the storage type print job data. The page analysis control portion 20 operates in the following manner.

The page analysis control portion 20, upon receipt of the job ID sent from the receiving portion 10 for the page analysis processing, determines the type of the job ID, that is, whether the job ID is of the print type print job data or of the storage type print job data and makes the control action on the basis of the type of the job ID, whether the page analysis portion 25 has a current job, the type of the print job data on which the current job is executed when the page analysis portion 25 has a current job and whether there is print job data (job ID) waiting for the processing in the analysis queue 22. When the page analysis portion 25 has no current job (Naturally, there is no job ID of the print job data waiting for the processing in the analysis queue 22), the page analysis control portion 20 outputs the received job ID to the page analysis portion 25 to make a page analysis instruction. The page analysis portion 25 reads out from the storage portion 18 print job data corresponding to the job ID delivered from the page analysis control portion 20 and executes the page analysis processing page by page. Then the page analysis portion 25 causes the storage portion 18 to store the result of the page analysis, including information representing the page number (e.g. a first page, a second page and so on) of the page and whether the page is the last page of the print job data represented by the job ID, in linkage with job ID and at the same time, makes a finishing report that the page analysis for one page has been ended to the page analysis control portion 20 each time the page analysis for one page has been ended. The finishing report from the page analysis portion 25 to the page analysis control portion 20 comprises the following contents.

1. job ID
2. the page number of the page the page analysis processing on which has been ended
3. whether the page is the last page The page analysis control portion 20 transmits the above contents to the print control portion 30 each time it receives the finishing report from the page analysis portion 25, thereby making the finishing advice.

When there is a current job in the page analysis portion 25 and the current job is to be executed on the print type print job data upon receipt of the request for the page analysis from the receiving portion 10, the page analysis control portion 20 causes the print queue 22a to temporarily store the job ID of the print type print job data or the hold queue 22b to temporarily store the job ID of the storage type print job data according to the type of the job ID sent from the receiving portion 10.

When there is a current job in the page analysis portion 25 and the current job is to be executed on the print type print job data, the page analysis control portion 20 causes the page analysis portion 25 to execute the page analysis processing on the print job data corresponding to the job ID stored in the analysis queue 22 from that stored in the print queue 22a as soon as the current job is ended. In the case where a plurality of job IDs are respectively stored in the print queue 22a and the hold queue 22b, the page analysis control portion 20 causes the page analysis portion 25 to execute the page analysis processing in the order of receipt of the pieces of print job data corresponding to the job IDs. That is, the page analysis control portion 20 first causes the page analysis portion 25 to execute the page analysis processing on the pieces of the print job data corresponding to the job IDs temporarily stored in the print queue 22a and then causes the page analysis portion 25 to execute the page analysis processing on the pieces of the print job data corresponding to the job IDs temporarily stored in the hold queue 22b after the page analysis processing on all the pieces of the print job data corresponding to the job IDs temporarily stored in the print queue 22a is ended.

Whereas in the case where the page analysis portion 25 has a current job and the current job is to be executed on the storage type print job data when the page analysis processing is requested from the receiving portion 10, the page analysis control portion 20, if the job ID sent from the receiving portion 10 is that of the storage type print job data, causes the analysis queue 22 (the hold queue 22b in this case) to temporarily store the print job data as the job ID of the print job data waiting for the processing and if the job ID sent from the receiving portion 10 is that of the print type print job data, causes the page analysis processing by the page analysis portion 25 to be interrupted, and transmits the job ID of the print type print job data, sent from the receiving portion 10, to the page analysis portion 25 to execute the page analysis processing. Upon receipt of a finishing report representing that the page analysis processing on the last page of the print type print job data has been ended from the page analysis portion 25, the page analysis control portion 20 causes the page analysis portion 25 to resume the interrupted page analysis processing on the storage type print job data. When causing the page analysis portion 25 to resume the interrupted page analysis processing, the page analysis control portion 20 checks whether there is a job ID in the print queue 22a (that is, whether print type print job data waiting for the processing for which request for the page analysis is made due to the fact that another print type print job data is received during the page analysis processing on the print type print job data is in the print queue 22a), and when there is a job ID in the print queue 22a, the page analysis control portion 20 causes the page analysis portion 25 to first execute the page analysis on the print job data corresponding to the job ID in the print queue 22a while when there is no job ID in the print queue 22a, the page analysis control portion 20 causes the page analysis portion 25 to immediately resume the interrupted page analysis processing.

Instructions from the page analysis control portion 20 to the page analysis portion 25 includes three types of instructions, an instruction to cause the page analysis portion 25 to execute the page analysis processing by transmitting the job ID, an instruction to cause the page analysis portion 25 to interrupt the page analysis processing on the storage type print job data and an instruction to cause the page analysis portion 25 to resume the interrupted page analysis processing on the print job data. The page analysis portion 25 executes the page analysis processing page by page according to the instruction from the page analysis control portion 20 and makes the finishing report to the page analysis control portion 20 each time the page analysis processing on each page has been ended. The page analysis control portion 20 transmits the contents of the finishing report to the print control portion 30, thereby making a finishing advice to the print control portion 30. Further, the page analysis portion 25 causes the storage portion 18 to store the result of the page analysis processing in linkage with the job ID. That is, the storage portion 18 stores the print job data and the job ID in linkage with each other, and at the same time, the result of the page analysis in linkage with the job ID for the page analyzed print job data.

The print control portion 30, upon receipt of the finishing advice from the page analysis control portion 20, determines the type of the job ID included in the finishing advice, that is, whether the type of the job ID included in the finishing advice is of a print-only type, print/storage type or of a storage type, and controls the action of the memory portion 26, the expansion portion 40, the print engine 95 and the panel 90 according to the type of the job ID. The case where the type of the job ID included in the finishing advice is of a print-only type will be described first.

The print control portion 30 transmits to the expansion portion 40 information representing the contents of the finishing advice and the storage portion 18 which stores the print job data corresponding to the job ID, thereby making an expansion instruction to the expansion portion 40.

The expansion portion 40, according to the contents of the finishing advice transmitted from the print control portion 30, reads out the corresponding page of the print job data corresponding to the job ID from the storage portion 18 and executes thereon the expansion processing to obtain the print data for the page. Then the expansion portion 40 outputs the print data to the print engine 95 and at the same time, reports that the expansion processing has been ended to the print control portion 30. The contents of the expansion processing finishing report to be sent to the print control portion 30 from the expansion portion 40 comprises the job ID, the page number of the page the page analysis processing on which has been ended, and information representing whether the page the page analysis processing on which has been ended is the last page.

The print control portion 30, when the finishing report from the expansion portion 40 represents that the expansion processing on the last page of the print-only type print job data has been ended, deletes the corresponding print job data, the result of the analysis executed thereon and the job ID corresponding thereto from the storage portion 18.

The case where the type of the job ID included in the finishing advice is of a storage type will be described next.

The print control portion 30 transmits to the memory portion 26 the contents of the finishing report as a storage instruction.

The memory portion 26, according to the storage instruction transmitted from the print control portion 30, reads out the corresponding page of the page analyzed data of the print job data corresponding to the job ID, that is, the data for the page and the result of the analysis, from the storage portion 18 and stores it in the hard disc 28 in linkage with the job ID and returns a finishing report to the print control portion 30 when the storage has been ended. The contents of the finishing report to be sent to the print control portion 30 from the memory portion 26 comprises the job ID, the page number of the page the storage of which has been ended, and information representing whether the page is the last page.

The print control portion 30, when the finishing report from the memory portion 26 represents that the last page of the storage type print job data has been stored, deletes the corresponding print job data, the result of the analysis executed thereon and the job ID corresponding thereto from the storage portion 18.

Further, the print control portion 30, when the job ID included in the received finishing advice is that of the storage type print job data, causes the touch panel 90 to update the contents of its display, the print job data corresponding to the job ID, each time it receives the finishing advice from the page analysis control portion 20. For example, when the contents of the finishing advice from the page analysis control portion 20 represent that the job ID is the job ID of the storage type print job data, that the analysis on the first page has been ended and that the page is not the last page, the print control portion 30 causes the touch panel 90 to display the file name of the print job data, the state of the page analysis ("under analysis", here) and the page number of the page the page analysis processing on which has been ended (the first page, here), and then, until it receives the finishing advice representing that the page is the last page, causes the touch panel 90 to update the page number each time it receives the finishing advice corresponding to each page of the print job data to which the job ID corresponds. When the print control portion 30 receives the finishing advice representing that the page is the last page, it causes the touch panel 90 to update the state of the page analysis to "analysis has been done".

In this manner, the page analyzed storage type print job data is stored in the hard disc 28 of the memory portion 26 and the print control portion 30 causes the touch panel 90 to display a table of the stored print job data (e.g., a list of the file names of the print job data) and the state of the print job data (the above mentioned "analysis has been done" or the like). The touch panel 90 can display a table of the print job data stored in the hard disc 28 of the memory portion 26, the number of pages of the print job data under the page analysis processing the page analysis processing on which has been ended, and the like under the control of the print control portion 30, and at the same time, the user can request displaying a brief of the print job data in the table such as the number of pages thereof or printing the print job in the table. The print control portion 30 causes the touch panel 90 to display a brief of the print job data displaying of which the user requests by way of the touch panel 90 on the basis of the page analysis thereon, and transmits to the expansion portion 40 the job ID corresponding to the requested print job data and information representing the hard disc 28 which stores the print job data corresponding to the job ID, thereby making an expansion instruction to the expansion portion 40.

The expansion portion 40 reads out the corresponding page analyzed data from the hard disc 28 in which the job ID transmitted from the print control portion 30 and the page analyzed data of the job ID (the print job data and the result of analysis thereon) are stored, and executes the expansion processing on each page of the print job data according to the result of analysis to obtain the print data, and outputs the print data to the print engine 95 while making an expansion finishing report to the print control portion 30. The contents of the finishing report to be sent to the print control portion 30 from the expansion portion 40 comprises the job ID, the page number of the page the expansion processing on which has been ended, and information representing whether the page is the last page as in the print type print job data.

The print control portion 30, upon receipt of the finishing report from the expansion portion 40 (the report that the expansion processing on the storage type print job data has been ended), causes the expansion portion 40 to output the print data obtained by ending the expansion processing also to the memory portion 26 and at the same time, transmits the contents of the finishing report from the expansion portion 40 to cause the memory portion 26 to store the print data corresponding to the job ID.

The memory portion 26 stores the print data transmitted from the expansion portion 40, in linkage with the job ID.

When the finishing report from the expansion portion 40 represents that page analysis processing on the last page of the storage type print job data has been ended, the print control portion 30 deletes the page analyzed data of the print job data from the memory portion 26 and at the same time, causes the touch panel 90 to update the state of the print job data displayed by the touch panel 90 from "analysis has been done" to "expansion has been done".

Finally the case where the type of the job ID included in the finishing advice is of a print/storage type will be described.

When the type of the job ID included in the finishing advice is of a print/storage type, the print control portion 30 transmits to the expansion portion 40 information representing the contents of the finishing advice and the storage portion 18 which stores the print job data corresponding to the job ID, thereby making an expansion instruction to the expansion portion 40.

The expansion portion 40, according to the contents of the finishing advice transmitted from the print control portion 30, reads out the corresponding page of the print job data corresponding to the job ID from the storage portion 18 and executes thereon the expansion processing to obtain the print data for the page. Then the expansion portion 40 outputs the print data to the print engine 95 and at the same time, reports that the expansion processing has been ended to the print control portion 30. The contents of the expansion processing finishing report to be sent to the print control portion 30 from the expansion portion 40 comprises the job ID, the page number of the page the page analysis processing on which has been ended, and information representing whether the page the page analysis processing on which has been ended is the last page.

The print control portion 30, upon receipt of the finishing report from the expansion portion 40 (the report that the expansion processing on the print/storage type print job data has been ended), causes the expansion portion 40 to output the print data obtained by ending the expansion processing also to the memory portion 26 and at the same time, transmits the contents of the finishing report from the expansion portion 40 to cause the memory portion 26 to store the print data corresponding to the job ID.

The memory portion 26, according to the storage instruction transmitted from the print control portion 30, stores the print data from the expansion portion in linkage with the job ID and returns a finishing report to the print control portion 30 when the storage has been ended. The contents of the finishing report to be sent to the print control portion 30 from the memory portion 26 comprises the job ID, the page number of the page the storage of which has been ended, and information representing whether the page is the last page.

When the finishing report from the memory portion 26 represents that the last page of the print/storage type print job data has been stored, the print control portion 30 deletes the corresponding print job data, the result of the analysis thereon and the job ID corresponding thereto from the storage portion 18 and at the same time, causes the touch panel 90 to display the file name of the print job data and the state thereof "expansion has been done".

Thus, the print control portion 30 causes the touch panel 90 to display three types of displays. As shown in the example shown in FIG. 3, a left portion of the touch panel 90 shows the number of the page analyzed pages of the storage type print job data A under the page analysis and a central portion of the touch panel 90 shows a table of the print job data stored in the memory portion 26 and the state thereof. There are two types in the states of the print job data displayed shown in the central portion of the touch panel 90, "analysis has been done" and "expansion has been done". The print job data B2, B3 and B4 which are displayed as "analysis has been done" are pieces of storage type print job data the page analysis processing on which has been ended and which do not undergo the print instruction, and the print job data B1 and C1 which are displayed as "expansion has been done" are pieces of print job data the expansion processing on which has been ended and print data of the print/storage type print job data or print data of the storage type print job data obtained by once making the print instruction to the page analyzed data which has been stored in the memory portion 26 and in the state of "analysis has been done" and executing thereon the expansion processing.

Further, when the user makes a print instruction of the page analyzed print job data by way of the touch panel 90, the print control portion 30 causes the expansion portion 40 to execute the expansion processing on the page analyzed print job data, whereas when the user makes a print instruction of the expanded print job data (the print job data the expansion processing on which has been ended), the print control portion 30 causes the memory portion 26 to directly output to the print engine 95 the print data of the print job data the print instruction of which has been made.

The print engine 95 generates printings according to the print data on the basis of the print data from the expansion portion 40 or the memory portion 26.

In the printer 100, the page analysis portion 25 and the expansion portion 40 can respectively execute the page analysis processing and the expansion processing in parallel by the multitasking of one CPU (not shown). As the system for the multitasking, the priority system is adopted and the expansion processing by the expansion portion 40 is higher in priority than the page analysis processing by the page analysis portion 25.

Figure 4:
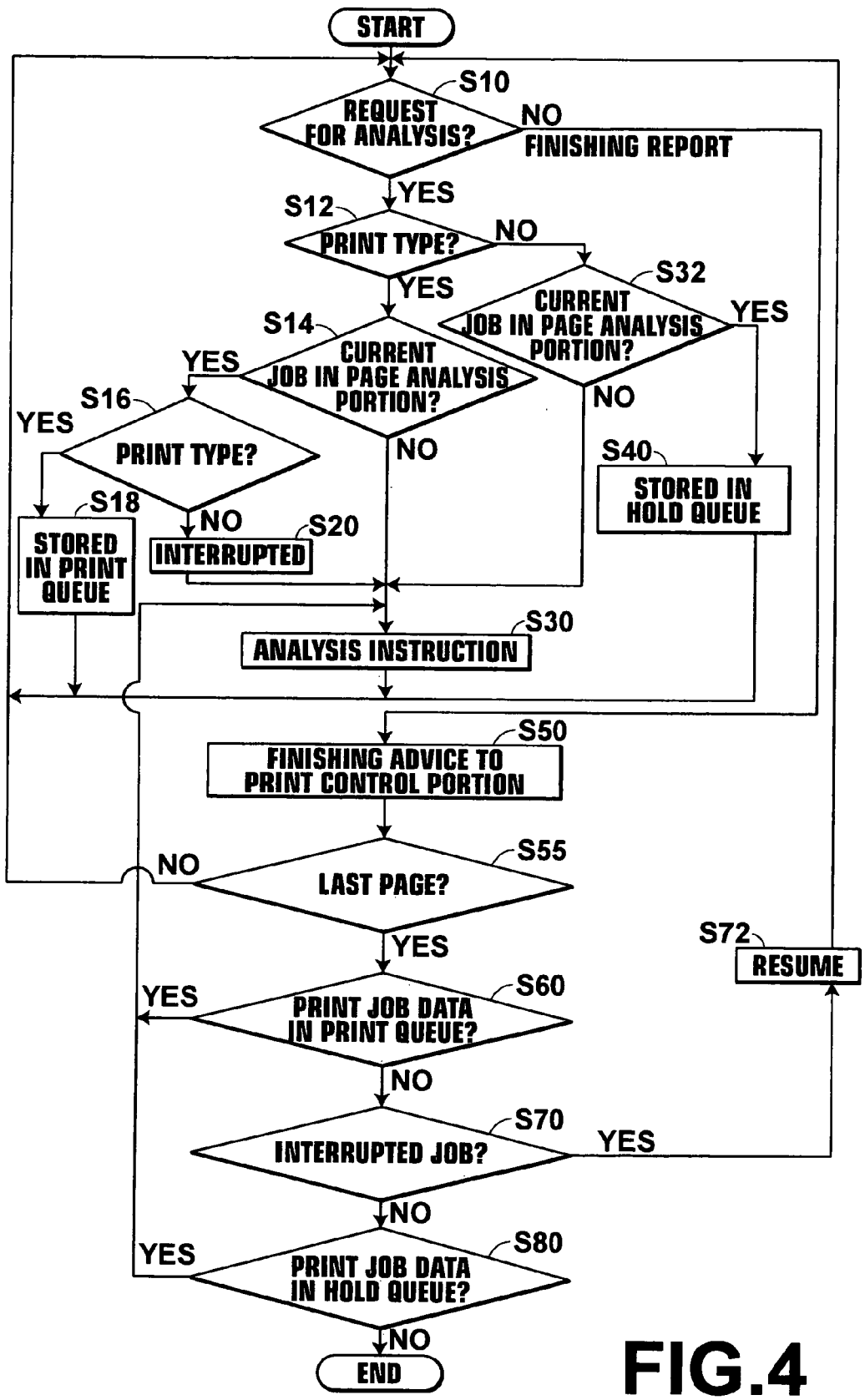
FIG. 4 is a flow chart for illustrating operation of the page analysis control portion of the printer shown in FIG. 2.

Operation of the printer 100 in the print system A shown in FIG. 1 will be described with reference to FIGS. 4 and 5, hereinbelow. In the printer 100, the receiving portion 10, upon receipt of the print job data, makes application for the job ID corresponding to the received print job data, receives the job ID issued from the print control portion 30 in response to the application and stores by the storage portion 18 the issued job ID in linkage with the print job data, and at the same time, transmits the job ID to the page analysis control portion 20 to make a request for the page analysis processing. The page analysis control portion 20 determines the type of the job ID transmitted from the receiving portion 10, and executes the page analysis processing on the corresponding print job data. FIG. 4 is a flow chart for illustrating the operation of the page analysis control portion 20.

As shown in FIG. 4, when receiving a job ID of the print type print job data and a request for the page analysis processing of the print job data corresponding to the received job ID from the receiving portion 10 (step S10:YES, step S12: YES), the page analysis control portion 20 checks whether the page analysis portion 25 has a current job (step S14), and when the page analysis portion 25 has no current job (step S14:NO), transmits the received job ID to the page analysis portion 25, thereby making an analysis instruction of the print job data corresponding to the job ID (step S30) whereas when the page analysis portion 25 has a current job (step S14:YES), the page analysis control portion 20 checks whether the print job data to be processed by the current job is of the print type or of the storage type (step S16). When the print job data to be processed by the current job is of the print type (step S16: YES), the print control portion 20 causes the print queue 22*a* to temporarily store the job ID received from the receiving portion 10 as a job ID of the print job data waiting for the processing (step S18), whereas when the print job data to be processed by the current job is of the storage type (step S16:NO), the print control portion 20 causes the page analysis portion 25 to interrupt the current job (step S20) and transmits the received job ID to the page analysis portion 25, thereby making an analysis instruction of the print job data corresponding to the job ID (step S30).

When receiving a job ID of the storage type print job data from the receiving portion 10 and a request for the page analysis processing of the print job data corresponding to the received job ID (step S10:YES, step S12:NO), the page analysis control portion 20 checks whether the page analysis portion 25 has a current job (step S32), and when the page analysis portion 25 has a current job (step S32:YES), the print control portion 20 causes the hold queue 22*b* to temporarily store the received job ID as a job ID of the storage type print job data waiting for the processing (step S40), whereas when the page analysis portion 25 has no current job (step S32:NO), transmits the received job ID to the page analysis portion 25, thereby making an analysis instruction of the print job data corresponding to the job ID (step S30).

As described above, the page analysis portion 25 reads out from the storage portion 18 print job data corresponding to the transmitted job ID according to the page analysis instruction from the page analysis control portion 20 and executes the page analysis processing page by page. Then the page analysis portion 25 causes the storage portion 18 to store the result of the page analysis, including information representing the page number (e.g. a first page, a second page and so on) of the page and whether the page is the last page of the print job data represented by the job ID, in linkage with job ID and at the same time, makes the finishing report to the page analysis control portion 20 each time the page analysis for one page has been ended.

The page analysis control portion 20, each time it receives the finishing report from the page analysis portion 25 (step S10:NO), transmits the contents of the finishing report (the job ID, the number of the pages the page analysis processing on which has been ended, whether the page is the last page) to the print control portion 30, thereby making the finishing advice thereto (step S50) and at the same time, when the contents of the finishing report represent that the page the page analysis processing on which is ended is the last page (step S55:YES), the page analysis control portion 20 checks whether there is in the print queue 22*a* a job ID of the print job data waiting for the processing (step S60). When there is in the print queue 22*a* a job ID of the print job data waiting for the processing, that is, when there is print type print job data waiting for the processing (step S60:YES), the page analysis control portion 20 outputs to the page analysis portion 25 the job ID corresponding to the print job data which is received earliest in these pieces of print job data and makes the page analysis instruction thereof (step S30) whereas when there is no job ID in the print queue 22*a*, that is, when there is no print type print job data waiting for the processing (step S60:NO), the page analysis control portion 20 checks whether there is an interrupted page analysis processing (step S70). The "interrupted page analysis processing" as used here means the page analysis processing interrupted by receiving print type print job data during the page analysis processing in step S20. When there is an interrupted page analysis processing (step S70:YES), the page analysis control portion 20 causes the page analysis portion 25 to resume the interrupted page analysis processing (step S72). Whereas when there is no interrupted page analysis processing (step S70:NO), the page analysis control portion 20 further checks whether there is in the hold queue 22*b* a job ID of the print job data waiting for the processing (step S80). When there is in the hold queue 22*b* a job ID, that is, when there is storage type print job data waiting for the processing (step S80:YES), the page analysis control portion 20 outputs to the page analysis portion 25 the job ID corresponding to the print job data which is received earliest in these pieces of print job data and makes the page analysis instruction thereof (step S30) whereas when there is no job ID in the hold queue 22*b*, that is, when there is no storage type print job data waiting for the processing (step S80:NO), the page analysis control portion 20 waits until new print job data is received, that is, until the receiving portion 10 makes a request for page analysis processing.

The print control portion 30 causes the touch panel 90 to display a table of the print job data stored in the hard disc 28 of the memory portion 26 and the state thereof, and initiates the control when it receives the finishing advice from the page analysis control portion 20 and the user makes the instruction by way of the touch panel 90. FIG. 5 is a flow chart for illustrating operation of the print control portion 30.

Figure 5:
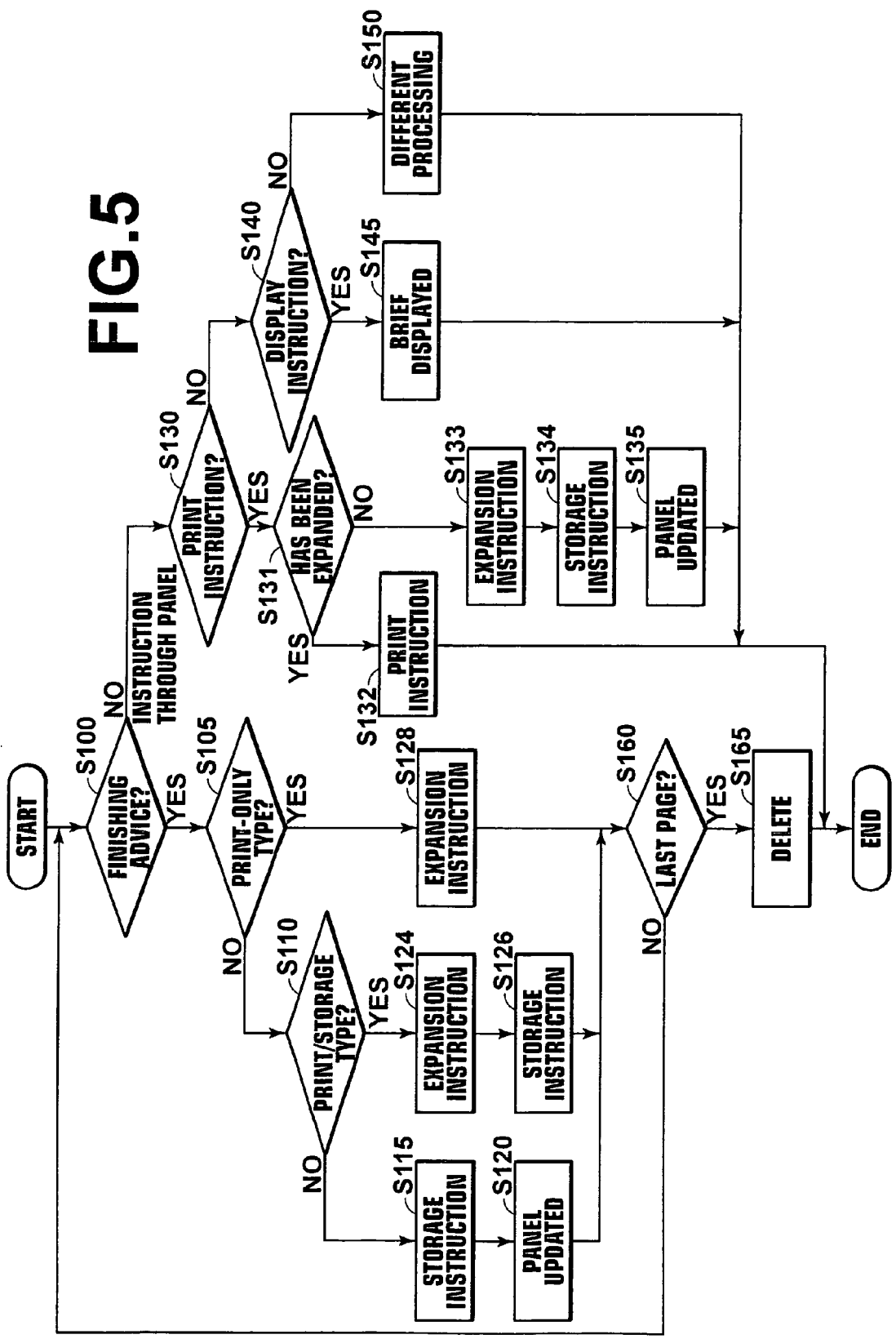
FIG. 5 is a flow chart for illustrating operation of the print control portion of the printer shown in FIG. 2.

As shown in FIG. 5, when receiving the finishing advice (this finishing advice is output from the page analysis control portion 20 to the print control portion 30 in step S50 in FIG. 4) from the page analysis control portion 20 (step S100:YES), the print control portion 30 determines the type of the received job ID. When the job ID included in the finishing advice is of a print-only type (step S105:YES), the print control portion 30 transmits to the expansion portion 40 the contents of the finishing advice and information representing the place where the page analyzed data (the data and the result of analysis) of the corresponding page of the print job data corresponding to the job ID included in the finishing advice is stored (the storage portion 18), thereby making an expansion instruction to the expansion portion 40 (step S128). As described above, the expansion portion 40, according to the expansion instruction from the print control portion 30, reads out the corresponding page of the print job data corresponding to the job ID from the storage portion 18 and executes thereon the expansion processing to obtain the print data for the page. Then the expansion portion 40 outputs the print data to the print engine 95 and at the same time, transmits the finishing report, comprising the job ID of the print job data to which the page analyzed page belongs, the page number of the page, and information representing whether the page is the last page, to the print control portion 30. When the finishing report from the expansion portion 40 represents that page analysis processing on the last page of the print-only type print job data has been ended (step S160:YES), the print control portion 30 deletes the corresponding print job data, the result of the analysis executed thereon and the job ID corresponding thereto from the storage portion 18 (step S165).

Whereas, when the job ID included in the finishing advice from the page analysis control portion 20 is of a storage type (step S105:NO, step S110:NO), the print control portion 30 transmits to the memory portion 26 the contents of the finishing advice as a storage instruction and updates the contents of the display of the touch panel 90 (steps S115 and S120). The update of the contents of the display of the touch panel 90 includes two types, one of them being update of the number of page analyzed pages of the storage type print job data displayed in the left portion of the screen in the example shown in FIG. 3 and the other being update of the state of the print job data from "under analysis" to "analysis has been done" and shifting the place of display from the left portion to the central portion of the screen in the example shown in FIG. 3 when the finishing advice from the page analysis portion 20 represents that the page the page analysis processing on which has been ended is the last page. As described above, the memory portion 26, according to the storage instruction transmitted from the print control portion 30, reads out the corresponding page of the page analyzed data of the print job data corresponding to the job ID included in the storage instruction from the storage portion 18 and stores it in the hard disc 28 in linkage with the job ID and returns a finishing report comprising the job ID, the number of the pages the storage of which has been ended, and information representing whether the page is the last page to the print control portion 30 when the storage has been ended. The print control portion 30, when the finishing report from the memory portion 26 represents that the last page of the storage type print job data has been stored (step S160:YES), deletes the corresponding print job data, the result of the analysis executed thereon and the job ID corresponding thereto from the storage portion 18 (step S165).

Whereas, when the job ID included in the finishing report from the page analysis control portion 20 is of a print/storage type (step S105:NO, step S110:YES), the print control portion 30 transmits to the expansion portion 40 an expansion instruction, thereby making an expansion instruction to the expansion portion 40 (step S124). As described above, the expansion portion 40, according to the expansion instruction from the print control portion 30, executes the expansion processing and when the expansion processing has been ended, the expansion portion 40 outputs the print data of the page analyzed page to the print engine 95 and at the same time, reports that the expansion processing has been ended to the print control portion 30. In the case of the print/storage type print job data, the print control portion 30 causes the expansion portion 40 to further output the page analyzed print data to the memory portion 26 upon receipt of the finishing report from the expansion portion 40, and transmits the finishing report (from the expansion portion 40) to the memory portion 26 as the storage instruction (step S126). The memory portion 26, according to the storage instruction from the print control portion 30, stores the print data from the expansion portion 40 in linkage with the job ID thereof and at the same time, when the storage has been ended, transmits the finishing report to the print control portion 30. The print control portion 30, when the finishing report from the memory portion 26 represents that the last page of the storage type print job data has been stored (step S160:YES), deletes the corresponding print job data, the result of the analysis executed thereon and the job ID corresponding thereto from the storage portion 18 (step S165). In this case, the print control portion 30 causes the touch panel 90 to display the file name of the print/storage type print job data stored by the memory portion 26 (has been turned to the print data) and the state of the page analysis ("analysis has been done") (The central portion of the example shown in FIG. 3).

In this manner, the print-only type print job data is turned to the print data by way of the page analysis processing and the expansion processing and output to the print engine 95, which makes print on the basis of the print data. Whereas, the storage type print job data is turned to the page analyzed data by way of the page analysis processing and stored in the hard disc 28. Whereas, the print/storage type print job data is turned to the print data by way of the page analysis processing and the expansion processing and output to the print engine 95, which makes print on the basis of the print data, and at the same time, the print data is stored in the hard disc 28.

Again with reference to the flow chart shown in FIG. 5, when the user makes a request for printing a given piece of print job data in the displayed table by way of the touch panel 90 (step S10: NO, step S130:YES), the print control portion 30 first checks the state of the print job data to be printed (step S131). There two in the states of the print job data stored in the hard disc 28 of the memory portion 26, one being "analysis has been done" and the other being "expansion has been done", and the print control portion 30 causes the memory portion 26 to output the print job data in the state "expansion has been done" (in the form of the print data obtained by executing the expansion processing on the print job data, here) the print instruction on which has been made, directly to the print engine 95, thereby causing the print engine 95 to make print (step S131:YES, step S132), and when the print instruction has been made on the print job data in the state "page analysis has been done" (in the form of the page analyzed data, here), transmits the expansion instruction, comprising the job ID of the page analyzed data, the number of the pages to be expanded (a first page), information representing whether the page the page analysis processing on which is to be executed is the last page and information representing the hard disc 28 in which the page analyzed data has been stored, to the expansion portion 40, thereby making the expansion instruction to the expansion portion 40. According to the expansion instruction from the print control portion 30, the expansion portion 40 reads out the corresponding page of the corresponding page analyzed data from the hard disc 28 where the page analyzed data has been stored and executes thereon the expansion processing to obtain the print data for the page. Then the expansion portion 40 outputs the print data of the page the expansion processing on which has been ended to the print engine 95 and at the same time, transmits the finishing report to the print control portion 30 after the expansion processing has been ended. Upon receipt of the finishing report from the expansion portion 40, the print control portion 30 causes the expansion portion 40 to output the print data obtained by executing the expansion processing to the memory portion 26, transmits the finishing report (from the expansion portion 40) to the memory portion 26 as the storage instruction, and at the same time, transmits to the expansion portion 40 the expansion instruction on the page next to the page the expansion processing on which has been ended. Thus, the print control portion 30 causes expansion on the page analyzed data on which the print instruction has been made and storage of the expanded print data to be executed in the order of pages to the last page (steps S133 and S134), and upon receipt of the report from the memory portion 26 which represents that the storage of the print data of the last page of the page analyzed data has been ended, the touch panel 90 to update the state of the corresponding print job data from "under analysis" to "analysis has been done" (step S135).

Though not shown, the print control portion 30 deletes the page analyzed data corresponding to the stored print data at this time.

That is, the page analyzed data of the storage type print job data which does not undergo the print instruction from the touch panel 90 but the storage instruction on which has been made in step S115 (in the state "analysis has been done"), the print data of the print/storage type print job data stored in step S126 (in the state "expansion has been done") and the print data obtained by making the print instruction by way of the touch panel 90 on the page analyzed data of the print job data on which the storage instruction has been made in step S115 and expanding the page analyzed data by the expansion portion 40 (in the state "expansion has been done") are stored in the hard disc 28.

Whereas, when the user instructs by way of the touch panel 90 displaying a brief of a given piece of print job data in the displayed table (step S100:NO, step S130:NO, step S140: YES), the print control portion 30 causes the touch panel 90 to display a brief of the print job data (display of which is instructed) including the number of pages thereof on the basis of the page analyzed data or the print data of the corresponding print job data (step S145). When the user makes another instruction e.g., an instruction to delete a given page analyzed data stored in the hard disc 28, by way of the touch panel 90 (step S100:NO, step S130:NO, step S140:NO), the print control portion 30 makes control according to the instruction (step S150).

As described above, in the printer 100 in the print system A shown in FIG. 1, when the print type print job data is received during the page analysis processing on the storage type print job data by the page analysis portion 25, the executing page analysis processing is once interrupted and the page analysis on the received print type print job data is executed prior to the executing page analysis processing, the interrupted page analysis processing on the storage type print job data is resumed in parallel to the expansion processing on the print type print job data by the expansion portion 40 after the page analysis processing thereon, whereby the print type print job data is preferentially processed, and the demand that printings can be quickly obtained of the user who has sent the print type print job data can be met and at the same time the user who has sent the storage type print job data can quickly confirm whether the storage type print job data can be regularly received by the printer and the number of pages received by the printer.

Further, in the printer 100 in the print system A shown in FIG. 1, though the page analyzed data of the storage type print job data is once stored, when the stored page analyzed data once undergoes the print instruction by way of the touch panel 90 and the expansion processing is executed on the stored page analyzed data by the expansion portion 40 to obtain the print data, the print data is stored, and when the print instruction is subsequently made on the same print job data by way of the touch panel 90, the stored print data is output directly to the print engine 95 in place of the page analyzed data, the printing of the stored storage type print job data can be quickly made from the second time.

Figure 6:
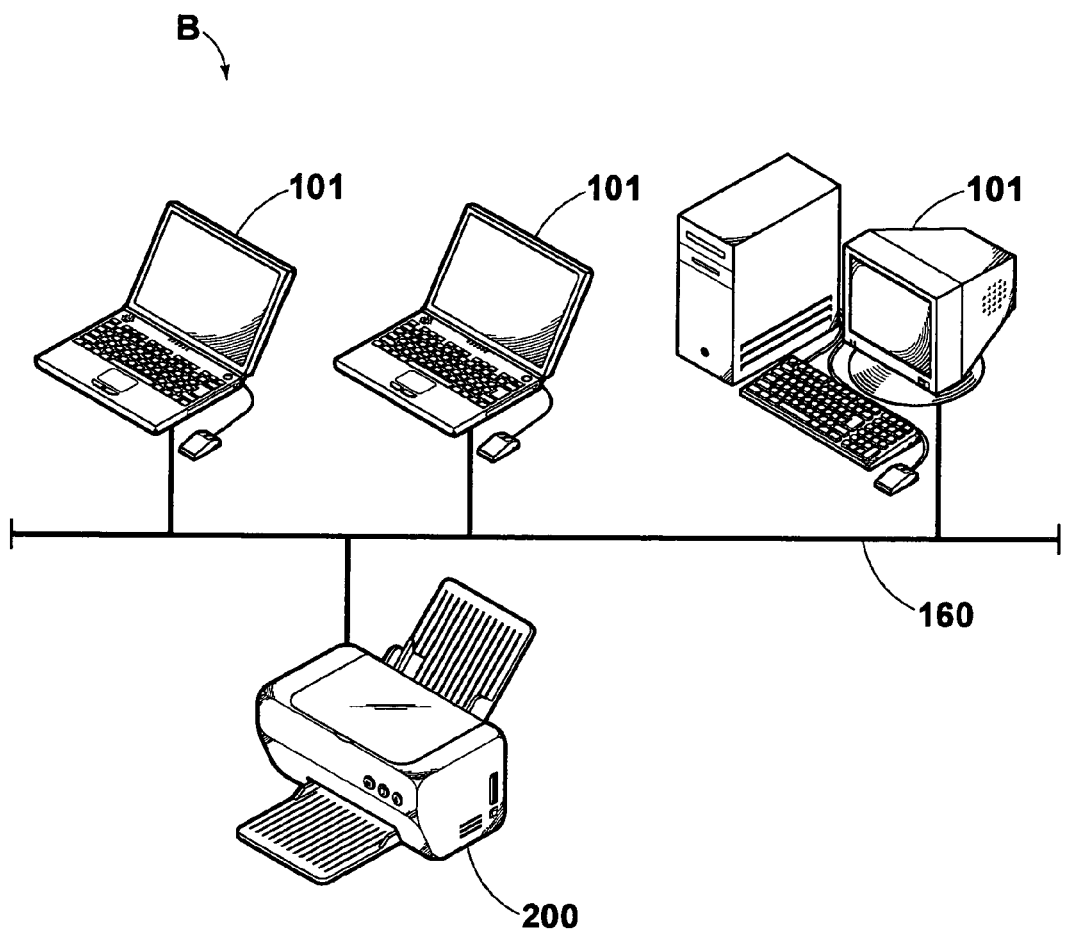
FIG. 6 is a block diagram showing a print system B which is a second embodiment of the present invention.

In FIG. 6, a print system B in accordance with a second embodiment of the present invention comprises a plurality of personal computers 101 and a printer 200 connected to the personal computers 101 byway of a network 160. The printer 200 can deal with print-only type print job data solely including a print instruction, print/storage type print job data including both the print instruction and the storage instruction and storage type print job data solely including a storage instruction, and each of the computers 101 are loaded with a printer driver for the printer 200 and outputs to the printer 200 one of the three types of print job data according to the setting by the user to cause the printer 200 to make print.

Figure 7:
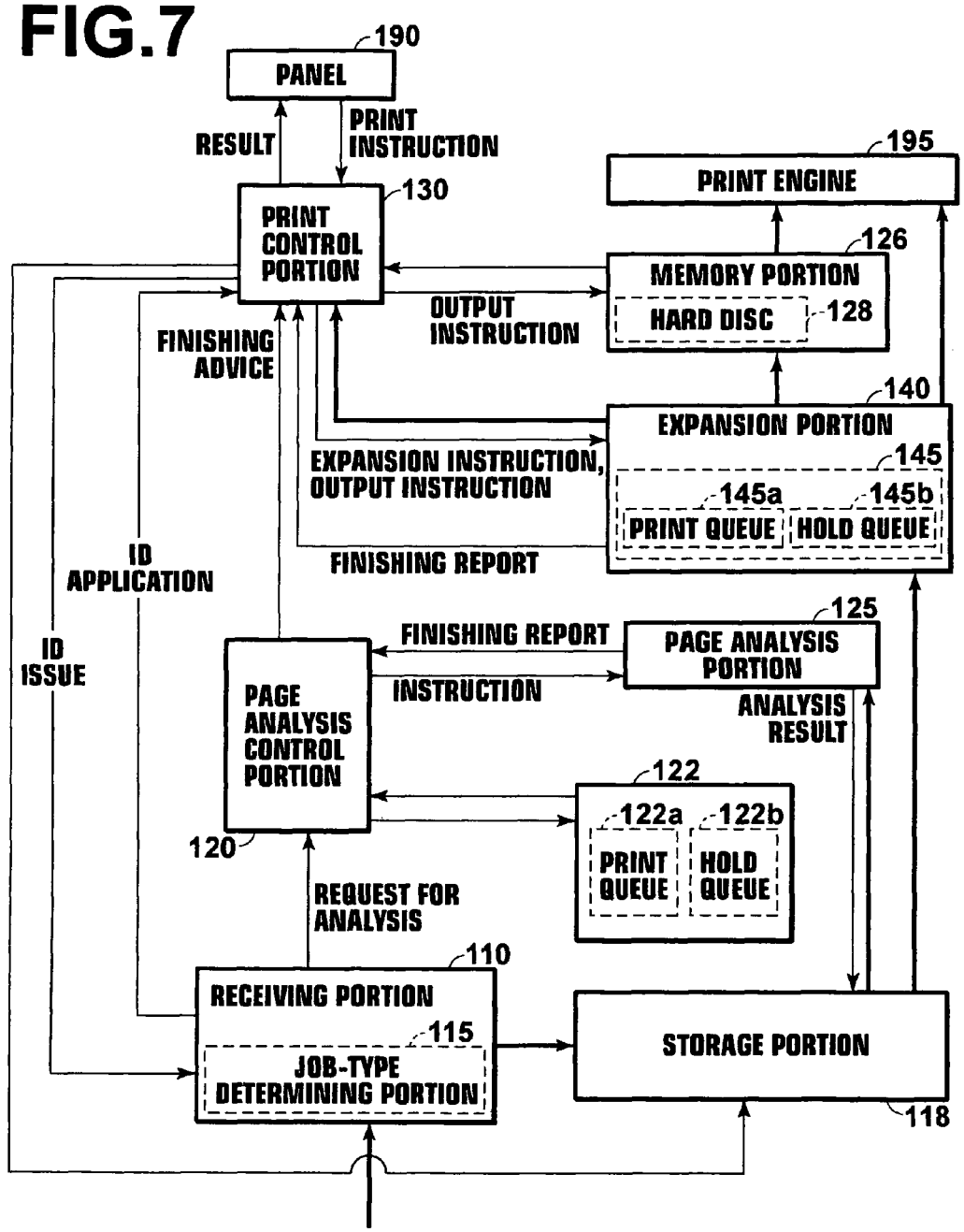
FIG. 7 is block diagram showing the structure of the printer employed in the print system B shown in FIG. 6.

FIG. 7 shows the structure of the printer 200 employed in the print system B shown in FIG. 6. As shown in FIG. 7, the printer 200 comprises a receiving portion 110, a storage portion 118, a page analysis control portion 120, an analysis queue 122, a page analysis portion 125, a memory portion 126, a print control portion 130, an expansion portion 140, a panel 190 and a print engine 195. The receiving portion 110 is provided with a job-type determining portion 115 and the memory portion 126 is provided with a hard disc 128. In FIG. 7, the arrows in a thick line represent the flow of data including the print job data and the arrows in a thin line represent the flow of data not including the print job data.

The components of the printer 200 will be described in detail, hereinbelow.

The receiving portion 110 receives the print job data sent from each of the computers 101, determines the type of the received print job data, makes application for a job ID of the received print job data, and issues a request for the page analysis of the received print job data. More particularly, the receiving portion 110 first receives the print job data from each of the computers 101. The job-type determining portion 115 determines whether the received print job data is the print-only type print job data, the print/storage type print job data or the storage type print job data. The receiving portion 110 outputs the result of the determination by the job-type determining portion 115 to the print control portion 130 and makes application for a job ID of the received print job data, and causes the storage portion 118 to store the job ID, issued from the print control portion 130 in response to the application, in linkage with the received print job data, and outputs the issued job ID to the page analysis control portion 120, thereby issuing a request for the page analysis of the received print job data. Though will be described in detail later, the print control portion 130 issues a job ID according to the type of the print job data in response to the application for a job ID from the receiving portion 110.

The receiving portion 110 makes application for a job ID to the print control portion 130 before issuing a request for the page analysis to the page analysis control portion 120 upon receipt of the print job data. However since application of the job ID and issue of the job ID both can be executed in a very short time, the receiving portion 110 makes application for a job ID of the received print job data, receives the job ID and issues a request for the page analysis to the page analysis control portion 120 substantially simultaneously with receipt of the print job data. The following description will be made on the assumption that the receiving portion 110 receives the print job data and issues a request for the page analysis to the page analysis control portion 120 at the same timing.

The page analysis portion 125 executes the page analysis processing on the print job data under the control of the page analysis control portion 120 to obtain the result of page analysis, and the analysis queue 122 temporarily stores the print job data waiting for the page analysis processing by the page analysis portion 125 (the corresponding job ID in this particular embodiment) and comprises a print queue 122a which temporarily stores the job ID of the print type print job data (the print-only type print job data and the print/storage type print job data) and a hold queue 122b which temporarily stores the job ID of the storage type print job data. The page analysis control portion 120 operates in the following manner.

The page analysis control portion 120, upon receipt of the job ID sent from the receiving portion 110 for the page analysis processing, determines the type of the job ID, that is, whether the job ID is of the print type print job data or of the storage type print job data and makes the control action on the basis of the type of the job ID, whether the page analysis portion 125 has a current job, the type of the print job data on which the current job is executed when the page analysis portion 125 has a current job and whether there is print job data (job ID) waiting for the processing in the analysis queue 122. When the page analysis portion 125 has no current job (In most cases, there is no job ID of the print job data waiting for the processing in the analysis queue 122), the page analysis control portion 120 outputs the received job ID to the page analysis portion 125 to make a page analysis instruction. The page analysis portion 125 reads out from the storage portion 118 print job data corresponding to the job ID delivered from the page analysis control portion 120 and executes the page analysis processing page by page. Then the page analysis portion 125 causes the storage portion 118 to store the result of the page analysis, including information representing the page number (e.g. a first page, a second page and so on) of the page and whether the page is the last page of the print job data represented by the job ID, in linkage with job ID and at the same time, makes a finishing report that the page analysis for one page has been ended to the page analysis control portion 120 each time the page analysis for one page has been ended. The finishing report from the page analysis portion 125 to the page analysis control portion 120 comprises the following contents.

job ID, the page number of the page the page analysis processing on which has been ended, and information representing whether the page is the last page.

The page analysis control portion 120 transmits the above contents to the print control portion 130 each time it receives the finishing report from the page analysis portion 125, thereby making the finishing advice.

When there is a current job in the page analysis portion 125 and the current job is to be executed on the print type print job data upon receipt of the request for the page analysis from the receiving portion 110, the page analysis control portion 120 causes the print queue 122*a* to temporarily store the job ID of the print type print job data or the hold queue 122*b* to temporarily store the job ID of the storage type print job data according to the type of the job ID sent from the receiving portion 110.

When there is a current job in the page analysis portion 125 and the current job is to be executed on the print type print job data, the page analysis control portion 120 causes the page analysis portion 125 to execute the page analysis processing on the print job data corresponding to the job ID stored in the analysis queue 122 from that stored in the print queue 122*a* as soon as the current job is ended. In the case where a plurality of job IDs are respectively stored in the print queue 122*a* and the hold queue 122*b*, the page analysis control portion 120 causes the page analysis portion 125 to execute the page analysis processing in the order of receipt of the pieces of print job data corresponding to the job IDs. That is, the page analysis control portion 120 first causes the page analysis portion 125 to execute the page analysis processing on the pieces of the print job data corresponding to the job IDs temporarily stored in the print queue 122*a* and then causes the page analysis portion 125 to execute the page analysis processing on the pieces of the print job data corresponding to the job IDs temporarily stored in the hold queue 122*b* after the page analysis processing on all the pieces of the print job data corresponding to the job IDs temporarily stored in the print queue 122*a* is ended.

Whereas in the case where the page analysis portion 125 has a current job and the current job is to be executed on the storage type print job data when the page analysis processing is requested from the receiving portion 110, the page analysis control portion 120, if the job ID sent from the receiving portion 110 is that of the storage type print job data, causes the analysis queue 122 (the hold queue 122*b* in this case) to temporarily store the print job data as the job ID of the print job data waiting for the processing and if the job ID sent from the receiving portion 110 is that of the print type print job data, causes the page analysis processing by the page analysis portion 125 to be interrupted, and transmits the job ID of the print type print job data, sent from the receiving portion 110, to the page analysis portion 125 to execute the page analysis processing. Upon receipt of a finishing report representing that the page analysis processing on the last page of the print type print job data has been ended from the page analysis portion 125, the page analysis control portion 120 causes the page analysis portion 125 to resume the interrupted page analysis processing on the storage type print job data. When causing the page analysis portion 125 to resume the interrupted page analysis processing, the page analysis control portion 120 checks whether there is a job ID in the print queue 122*a* (that is, whether print type print job data waiting for the processing for which request for the page analysis is made due to the fact that another print type print job data is received during the page analysis processing on the print type print job data is in the print queue 122*a*), and when there is a job ID in the print queue 122*a*, the page analysis control portion 120 causes the page analysis portion 125 to first execute the page analysis on the print job data corresponding to the job ID in the print queue 122*a* while when there is no job ID in the print queue 122*a*, the page analysis control portion 120 causes the page analysis portion 125 to immediately resume the interrupted page analysis processing.

Instructions from the page analysis control portion 120 to the page analysis portion 125 includes three types of instructions, an instruction to cause the page analysis portion 125 to execute the page analysis processing by transmitting the job ID, an instruction to cause the page analysis portion 125 to interrupt the page analysis processing on the storage type print job data and an instruction to cause the page analysis portion 125 to resume the interrupted page analysis processing on the print job data. The page analysis portion 125 executes the page analysis processing page by page according to the instruction from the page analysis control portion 120 and makes the finishing report to the page analysis control portion 120 each time the page analysis processing on each page has been ended. The page analysis control portion 120 transmits the contents of the finishing report to the print control portion 130, thereby making a finishing advice to the print control portion 130. Further, the page analysis portion 125 causes the storage portion 118 to store the result of the page analysis processing in linkage with the job ID. That is, the storage portion 118 stores the print job data and the job ID in linkage with each other, and at the same time, the result of the page analysis in linkage with the job ID for the page analyzed print job data.

The expansion portion 140 obtains the print data by executing the expansion processing on the page analyzed data under the control of the print control portion 130. An expansion queue 145 temporarily stores the page analyzed data (the finishing advice of the corresponding page analyzed data from the page analysis control portion 120 here, and the same in the following) waiting for the expansion processing by the expansion portion 140 and comprises a print queue 145*a* which temporarily stores the page analyzed data of the print type (print-only type and print/storage type) print job data and a hold queue 145*b* which temporarily stores the page analyzed data of the storage type print job data. The print control portion 130 operates in the following manner.

The print control portion 130, upon receipt of the finishing advice from the page analysis control portion 120, determines the type of the job ID included in the finishing report, that is, whether the type of the job ID included in the finishing report is of a print-only type, print/storage type or of a storage type, and controls according to the type of the job ID, whether the expansion portion 140 has a current job, the type of the page analyzed data to be processed by the current job (in the case the expansion portion 140 has a current job), whether there is page analyzed data (job ID) waiting for the processing in the expansion queue 145 or the like.

The case where the expansion portion 140 has no current job (In most cases, there is no job ID of the page analyzed data waiting for the processing in the expansion queue 145), will be described first.

When there is no current job in the expansion portion 140 upon receipt of the finishing advice from the page analysis control portion 120, the print control portion 130 transmits to the expansion portion 140 information representing the contents of the finishing report and the destination to which the print data obtained by the expansion processing by the expansion portion 140 is output, as an expansion instruction. The print control portion 130 designates as the destination only the print engine 195, only the memory portion 126, and both the print engine 195 and the memory portion 126 respectively to the job ID of the print-only print job data, the job ID of the storage type print job data and the print/storage type print job data according to the type of the job ID included in the finishing advice. The expansion portion 140, according to the expansion instruction from the print control portion 130, reads out the corresponding page of the print job data corresponding to the job ID from the storage portion 118 and executes thereon the expansion processing to obtain the print data for the page. Then the expansion portion 140 outputs the print data to the destination designated in the expansion instruction and at the same time, reports that the expansion processing has been ended to the print control portion 130. That is, the print data of the print-only type print job data is output to only the print engine 195, the print data of the storage type print job data is output to only the memory portion 126 and the print data of the print/storage type print job data is output to both the print engine 195 and the memory portion 126. The contents of the finishing report to the print control portion 130 from the expansion portion 40 comprises the job ID, the page number of the page the page analysis processing on which has been ended (a first page, a second page and so on), and information representing whether the page is the last page.

The case where the expansion portion 140 has a current job and the current job is to be executed on the page analyzed data of the print type (print-only type and print/storage type) print job data, will be described next. In this case, the print control portion 130 temporarily stores the contents of the finishing advice of the print type print job data in the print queue 145a and the contents of the finishing advice of the storage type print job data in the hold queue 145b according to the type of the job ID included in the finishing advice from the page analysis control portion 120.

As soon as the current job (here the current job is to be executed on the page analyzed data of the print type print job data) is ended, the print control portion 130 causes the expansion portion 140 to execute the expansion processing on the page analyzed data corresponding to the job ID included in the finishing advice temporarily stored in the expansion queue 145 from the finishing advice stored in the print queue 145a and at the same time, designates the destination of output according to the type of the job ID included in the finishing advice to the expansion portion 140. When a plurality of advices are respectively in the print queue 145a and the hold queue 145b, the print control portion 130 makes the expansion instruction to the expansion portion in the order of receipt. That is, the print control portion 130 causes the expansion portion 140 to execute, in the order of receipt, the expansion processing on the page analyzed data corresponding to the job ID included in the finishing advice temporarily stored in the print queue 145a, and after the expansion processing on the page analyzed data corresponding to the job ID included in the finishing advice temporarily stored in the print queue 145a, the print control portion 130 causes the expansion portion 140 to execute, in the order of receipt, the expansion processing on the page analyzed data corresponding to the job ID included in the finishing advice temporarily stored in the hold queue 145b. The expansion instruction made to the expansion portion 140 includes the destination of output according to the type of job ID included in the finishing advice as well as the contents of the finishing advice.

Finally the case where the expansion portion 140 has a current job and the current job is to be executed on the storage type page analyzed data will be described.

In this case, when the type of the job ID included in the finishing advice from the page analysis control portion 120 is of a storage type, the print control portion 130 causes the expansion queue 145 (the hold queue 145b in this case) to temporarily store the finishing advice, whereas when the type of the job ID included in the finishing advice from the page analysis control portion 120 is of a print type, the print control portion 130 causes the current job of the expansion portion 140 to be interrupted, and transmits the finishing advice from the page analysis control portion 120 and the destination of output according to the job ID in the finishing advice to the expansion portion 140 as the expansion instruction, thereby causing the expansion portion 140 to execute the expansion processing, and the print control portion 130, upon receipt of the finishing report from the expansion portion 40 (the report that the expansion processing in response to the expansion instruction has been ended), causes the interrupted expansion processing on the page analyzed data of the storage type print job data to be resumed. When causing the expansion portion 140 to resume the interrupted processing, the print control portion 130 checks whether there is a finishing advice in the print queue 145a (that is, whether the finishing advice representing that the page analysis processing on the print type print data is ended is received during the expansion processing on the print type print job data), and when there is a finishing advice in the print queue 145a, the print control portion 130 outputs an expansion instruction on the page analyzed data corresponding to the job ID included in the finishing advice temporarily stored in the print queue 145a, whereas when there is no finishing advice in the print queue 145a, the print control portion 130 causes the interrupted expansion processing on the page analyzed data of the storage type print job data to be immediately resumed.

The memory portion 126 stores the print data (the print data of the print/storage type or the storage type print job data) output from the expansion portion 140.

Further, the print control portion 130 causes the touch panel 190 to display a table of the print data stored in the memory portion 126 (e.g., a list of the file names of the print job data, the list of the file names of the print job data will be referred to as "table A", hereinbelow), and at the same time, causes the touch panel 190 to display a table of pieces of print type or print/storage type print job data out of pieces of print job data which are waiting for the processing and have been temporarily stored in the expansion queue 145 and pieces of print job data which are waiting for the processing and are under processing by the expansion portion 140 and the states (like "page analysis has been done", "waiting for expansion", or "under expansion") and page number (like file A: "page analysis has been done", third page, file B: "under expansion", fourth page, . . . ) thereof (to be referred to as "table B", herein below). By way of the touch panel 190, the user can make an instruction for displaying a brief of the print data included in the table A such as the total number of pages thereof or for printing the print data included in the table A. The print control portion 130 causes the touch panel 190 to display a brief of the print data which is included in the table A and is instructed to display a brief thereof by the user by way of the touch panel 190, on the basis of the print data stored in the hard disc 128 and causes the memory portion 126 to output the corresponding print data stored in the memory portion 126 to the print engine 195 for the print data which is included in the table A instructed to print by the user by way of the touch panel 190.

The memory portion 126 outputs the corresponding print data to the print engine 195 according to the output instruction from the print control portion 130.

The print engine 195 generates printings according to the print data on the basis of the print data from the expansion portion 140 (in this case, the print data is that of the print-only type or print/storage type print job data) or the memory portion 126 (in this case, the print data is that of the print-only type or print/storage type print job data which has been stored in the hard disc 128 and instructed to print by the user by way of the touch panel 190).

The print control portion 130, upon receipt of the finishing report representing that the expansion processing on the last page of the page analyzed data corresponding to a given job ID from the expansion portion 140, deletes from the storing portion 118 the corresponding print job data, the result of analysis thereon and the job ID thereof.

In the printer 200, the page analysis portion 125 and the expansion portion 140 can respectively execute the page analysis processing and the expansion processing in parallel by the multitasking of one CPU (not shown). As the system for the multitasking, the priority system is adopted and the expansion processing by the expansion portion 140 is higher in priority than the page analysis processing by the page analysis portion 125.

Figure 8:
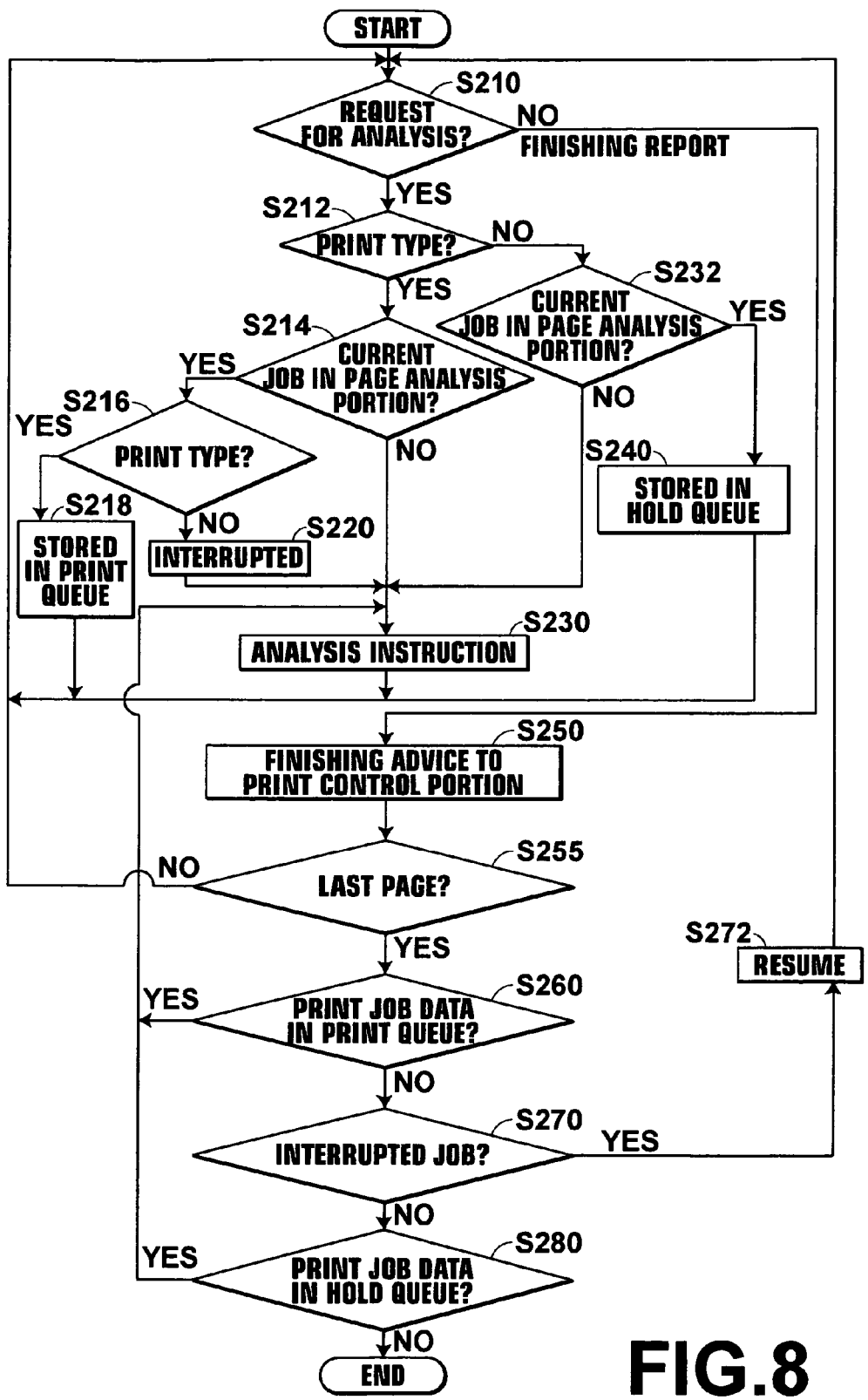
FIG. 8 is a flow chart for illustrating operation of the page analysis control portion of the printer shown in FIG. 7.

Operation of the printer 200 in the print system B shown in FIG. 6 will be described with reference to FIGS. 8 to 10, hereinbelow. In the printer 200, the receiving portion 110, upon receipt of the print job data, makes application for the job ID corresponding to the received print job data, receives the job ID issued from the print control portion 130 in response to the application and stores by the storage portion 18 the issued job ID in linkage with the print job data, and at the same time, transmits the job ID to the page analysis control portion 120 to make a request for the page analysis processing. The page analysis control portion 120 determines the type of the job ID transmitted from the receiving portion 110, and executes the page analysis processing on the corresponding print job data. FIG. 8 is a flow chart for illustrating the operation of the page analysis control portion 120.

As shown in FIG. 8, when receiving a job ID of the print type print job data from the receiving portion 110 and a request for the page analysis processing of the print job data corresponding to the received job ID (step S210:YES, step S212:YES), the page analysis control portion 120 checks whether the page analysis portion 125 has a current job (step S214), and when the page analysis portion 125 has no current job (step S214:NO), transmits the received job ID to the page analysis portion 125, thereby making an analysis instruction of the print job data corresponding to the job ID (step S230) whereas when the page analysis portion 125 has a current job (step S214:YES), the page analysis control portion 120 checks whether the print job data to be processed by the current job is of the print type or of the storage type (step S216). When the print job data to be processed by the current job is of the print type (step S216:YES), the print control portion 120 causes the print queue 122a to temporarily store the job ID received from the receiving portion 110 as a job ID of the print job data waiting for the processing (step S218), whereas when the print job data to be processed by the current job is of the storage type (step S216:NO), the print control portion 120 causes the page analysis portion 125 to interrupt the current job (step S220) and transmits the received job ID to the page analysis portion 125, thereby making an analysis instruction of the print job data corresponding to the job ID (step S230).

When receiving a job ID of the storage type print job data and a request for the page analysis processing of the print job data corresponding to the received job ID from the receiving portion 110 (step S210:YES, step S212:NO), the page analysis control portion 120 checks whether the page analysis portion 125 has a current job (step S232), and when the page analysis portion 125 has a current job (step S232:YES), the print control portion 120 causes the hold queue 122b to temporarily store the received job ID as a job ID of the storage type print job data waiting for the processing (step S240), whereas when the page analysis portion 125 has no current job (step S232:NO), transmits the received job ID to the page analysis portion 125, thereby making an analysis instruction of the print job data corresponding to the job ID (step S230).

As described above, the page analysis portion 125 reads out from the storage portion 118 print job data corresponding to the transmitted job ID according to the page analysis instruction from the page analysis control portion 120 and executes the page analysis processing page by page. Then the page analysis portion 125 causes the storage portion 118 to store the result of the page analysis, including information representing the page number (e.g. a first page, a second page and so on) of the page and whether the page is the last page of the print job data represented by the job ID, in linkage with job ID and at the same time, makes the finishing report to the page analysis control portion 120 each time the page analysis for one page has been ended.

The page analysis control portion 120, each time it receives the finishing report from the page analysis portion 25 (step S210:NO), transmits the contents of the finishing report (the job ID, the number of the pages the page analysis processing on which has been ended, whether the page is the last page) to the print control portion 130, thereby making the finishing advice thereto (step S250) and at the same time, when the contents of the finishing report represent that the page the page analysis processing on which is ended is the last page (step S255:YES), the page analysis control portion 120 checks whether there is in the print queue 122a a job ID of the print job data waiting for the processing (step S260). When there is in the print queue 122a a job ID of the print job data waiting for the processing, that is, when there is print type print job data waiting for the processing (step S260:YES), the page analysis control portion 120 outputs to the page analysis portion 125 the job ID corresponding to the print job data which is received earliest in these pieces of print job data and makes the page analysis instruction thereof (step S230) whereas when there is no job ID in the print queue 122a, that is, when there is no print type print job data waiting for the processing (step S260:NO), the page analysis control portion 120 checks whether there is an interrupted page analysis processing (step S270). The "interrupted page analysis processing" as used here means the page analysis processing interrupted by receiving print type print job data during the page analysis processing in step S220. When there is an interrupted page analysis processing (step S270:YES), the page analysis control portion 120 causes the page analysis portion 125 to resume the interrupted page analysis processing (step S272). Whereas when there is no interrupted page analysis processing (step S270:NO), the page analysis control portion 120 further checks whether there is in the hold queue 122b a job ID of the print job data waiting for the processing (step S280). When there is in the hold queue 122b a job ID, that is, when there is storage type print job data waiting for the processing (step S280:YES), the page analysis control portion 120 outputs to the page analysis portion 125 the job ID corresponding to the print job data which is received earliest in these pieces of print job data and makes the page analysis instruction thereof (step S230) whereas when there is no job ID in the hold queue 122b, that is, when there is no storage type print job data waiting for the processing (step S280:NO), the page analysis control portion 120 waits until new print job data is received, that is, until the receiving portion 110 makes a request for page analysis processing.

The print control portion 130 causes the touch panel 190 to display the tables A and B, and initiates the control when it receives the finishing advice from the page analysis control portion 120, it receives the finishing report from the expansion portion 140, and the user makes the instruction by way of the touch panel 190. FIGS. 9 and 10 show a flow chart for illustrating operation of the print control portion 130.

Figure 9:
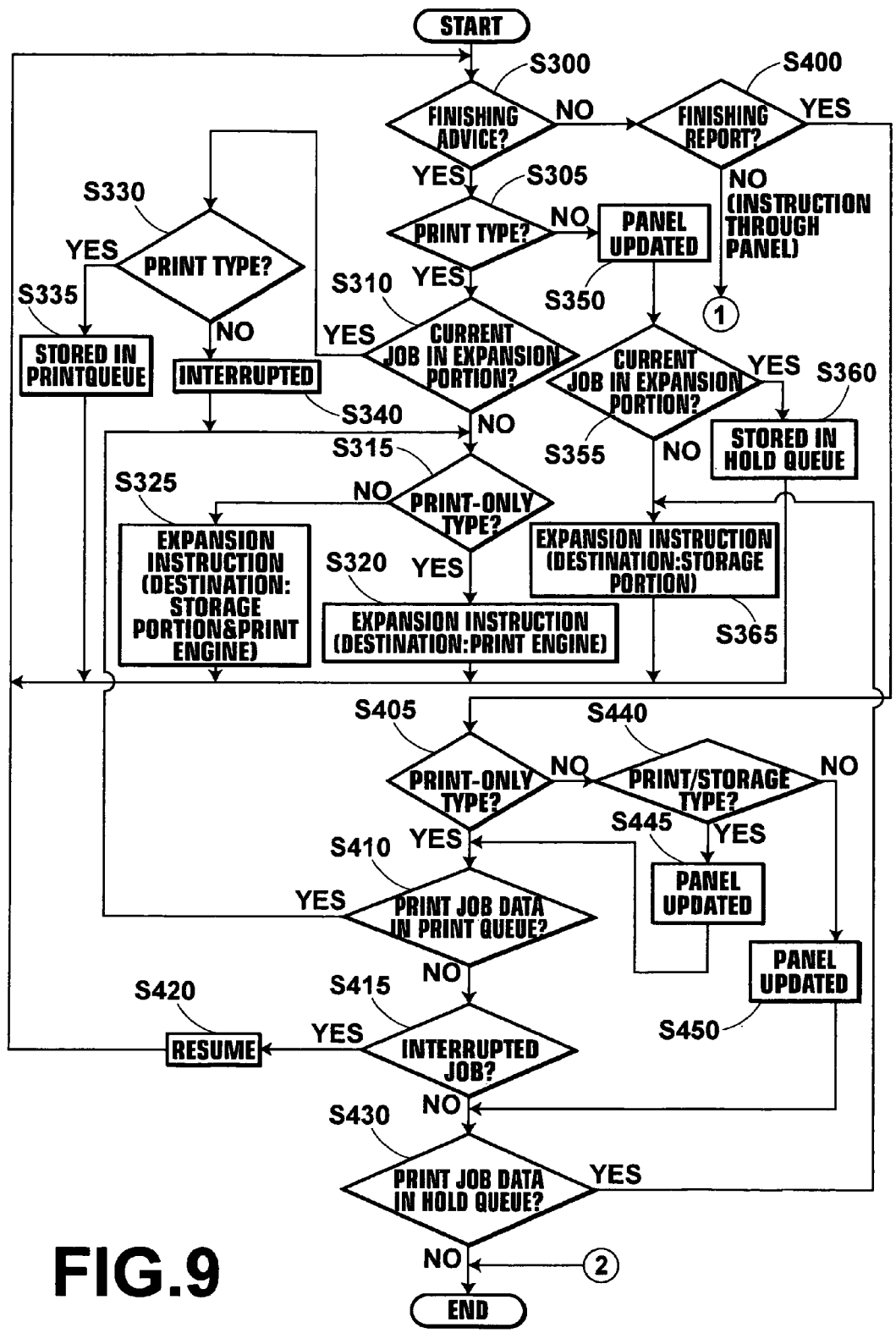
FIG. 9 is a part of a flow chart for illustrating operation of the print control portion of the printer shown in FIG. 7.

As shown in FIG. 9, when receiving the finishing advice (this finishing advice is output from the page analysis control portion 120 in step S250 in FIG. 8 to inform the print control portion 130 of that the page analysis processing on one page by the page analysis control portion 120 has been ended) from the page analysis control portion 120 (step S300:YES), the print control portion 130 determines the type of the job ID included in the finishing advice. When the job ID included in the finishing advice is of a print type (print-only type or print/storage type) (step S305:YES), the print control portion 130 checks whether the expansion portion 140 has a current job (step S310), and when the expansion portion 140 has no current job (step S310:NO), the print control portion 130 transmits to the expansion portion 140 the contents of the finishing advice from the page analysis control portion 120 and information representing the destination of the print data obtained by the expansion portion 140, thereby making an expansion instruction to the expansion portion 40 (steps S315, S320 and S325). Whereas, when the expansion portion 140 has a current job (step S310:YES), the print control portion 130 further checks whether the data to be processed by the current job is the page analyzed data of the print type print job data or the page analyzed data of the storage type print job data (step S330). When the data to be processed by the current job of the expansion portion 140 is the page analyzed data of the print type print job data (step S330:YES), the print control portion 130 causes the print queue 145a to temporarily store the finishing advice received from the page analysis control portion 120 (step S335), whereas when the data to be processed by the current job of the expansion portion 140 is the page analyzed data of the storage type print job data (step S330:NO), the print control portion 130 causes the expansion portion 140 to interrupt the current job (step S340) and at the same time, outputs the contents of the finishing advice received from the page analysis control portion 120 and information representing the destination of output of the print data obtained by the expansion portion 140, thereby making an expansion instruction to the expansion portion 140 (steps S315, S320 and S325). The processing in steps S315 to S325 is the processing where the print control portion 130 transmits the expansion instruction of the page analyzed data of the print type print job data to the expansion portion 140 to make the expansion instruction to the expansion portion 140, and for example, the print control portion 130 further checks the type of the job ID (print-only type or print/storage type here) included in the finishing advice (step S315). When the job ID included in the finishing advice is of print-only type print job data (step S315:YES), the print control portion 130 transmits to the expansion portion 140 the contents of the finishing advice and information representing that the destination of output is the print engine 195, as an expansion instruction (step S320) and when the job ID included in the finishing advice is of print/storage type print job data (step S315:NO), the print control portion 130 transmits to the expansion portion 140 the contents of the finishing advice and information representing that the destination of output is the print engine 195 and the memory portion 126, as an expansion instruction (step S325).

When the job ID included in the finishing advice received from the page analysis control portion 120 is of storage type print job data in step S305 (step S305:NO), the print control portion 130, according to the contents of the finishing advice, causes the touch panel 190 to update the display corresponding to the print job data of the corresponding job ID (step S350). For example, when the contents of the finishing advice represent that the job ID is of the storage type print job data, the page number (e.g. a first page, a second page and so on) of the page analysis processing on which has been ended and that the page is not the last page, the print control portion 130 causes the touch panel 190 to display the file name of the print job data corresponding to the job ID, the state thereof ("under analysis", here) and the page number of the page the page analysis processing on which has been ended, whereas when the contents of the finishing advice represent that the job ID is of the storage type print job data, the page number of the page the page analysis processing on which has been ended and that the page is the last page, the print control portion 130 causes the touch panel 190 to keep the file name of the print job data corresponding to the job ID unchanged and to update the state thereof to "analysis has been done".

The print control portion 130 causes the touch panel 190 to update the display (step S350) and checks whether the expansion portion 140 has a current job (step S355). When the expansion portion 140 has a current job (step S355:YES), the print control portion 130 causes the hold queue 145b to temporarily store the finishing advice from the page analysis control portion 120 (step S360). Whereas when the expansion portion 140 has no current job (step S355:NO), the print control portion 130 transmits to the expansion portion 140 an expansion instruction comprising the contents of the finishing advice and information designating the destination of output to the memory portion 126 (step S365).

As described above, the expansion portion 140, according to the expansion instruction from the print control portion 130, reads out the corresponding page of the corresponding page analyzed data from the storage portion 118 and executes thereon the expansion processing to obtain the print data for the page. Then the expansion portion 140 outputs the print data to the instructed destination of output and at the same time, transmits the finishing report, comprising the job ID, the page number of the page the page analysis on which has been ended, and information representing whether the page is the last page, to the print control portion 130. The memory portion 126 stores the print data from the expansion portion 140 in the hard disc 128. That is, pieces of print data of both the storage type and the print/storage type print job data are stored in the hard disc 128.

Again with reference to the flow chart shown in FIG. 9, the print control portion 130, upon receipt of the finishing report from the expansion portion 140 (step S300:NO, S400:YES), checks the job ID included in the finishing report (step S405). When the job ID is that of the print-only type print job data (step S405:YES), the print control portion 130 checks whether there is a finishing advice of the print job data waiting for the processing (a finishing advice of the print type print job data waiting for the processing) in the print queue 145a of the expansion queue 145 (step S410). When there is the finishing advice in the print queue 145a, that is, when there is page analyzed data of the print job data waiting for the expansion processing in the print queue 145a (step S410:YES), the print control portion 130 transmits to the expansion portion 140 an expansion instruction on the basis of the finishing advice which is received earliest, thereby making the expansion instruction to the expansion portion 140 (steps S315 to S320). When there is no finishing advice in the print queue 145a, that is, when there is no page analyzed data of the print job data waiting for the expansion processing in the print queue 145a (step S410:NO), the print control portion 130 further checks whether there is interrupted expansion processing (step S415). The "interrupted expansion processing" as used here means the expansion processing of the page analyzed data of the storage type print job data interrupted by receiving the finishing advice representing that the page analysis processing of the print type print job data has been ended during the expansion processing in step S340. When there is an interrupted expansion processing (step S415:YES), the print control portion 130 causes the expansion portion 140 to resume the interrupted expansion processing (step S420). Whereas when there is no interrupted expansion processing (step S415:NO), the print control portion 130 further checks whether there is in the hold queue 145b of the expansion queue 145 a finishing advice of the print job data (the storage type) waiting for the processing (step S430). When there is in the hold queue 145b of the expansion queue 145 a finishing advice, that is, when there is page analyzed data of storage type print job data waiting for the processing, the print control portion 130 transmits to the expansion portion 140 an expansion instruction on the basis of the finishing advice which is received earliest, thereby making the expansion instruction to the expansion portion 140 (step S430:YES, step S365). Whereas when there is no finishing advice in the hold queue 145b, that is, when there is no page analyzed data of storage type print job data waiting for the processing (step S430:NO), the print control portion 130 waits until a new finishing advice is received from the page analysis control portion 120 or until the user makes an instruction by way of the touch panel 190.

When the job ID included in the finishing report received from the expansion portion 140 is the ID of the print/storage type print job data (step S300:NO, step S400:YES, step S405:NO, step S440:YES), the print control portion 130, according to the contents of the finishing report, causes the touch panel 190 to update the display corresponding to the print job data of the corresponding job ID (step S445) and at the same time, executes the processing of step S410 where the print control portion 130 checks whether there is a finishing advice of the print type print job data waiting for the processing in the print queue 145a of the expansion queue 145 and the following steps. The processing in step S445 where the print control portion 130 causes the touch panel 190 to update the display is processing where, for example, when the contents of the finishing report represent that the job ID is of the print/storage type print job data, the page number (e.g. a first page, a second page and so on) of the page analysis processing on which has been ended and that the page is not the last page, the print control portion 130 causes the touch panel 190 to display the file name of the print job data corresponding to the job ID, the state thereof ("under expansion", here) and the page number of the page the expansion processing on which has been ended as well as the number of pages the expansion processing on which has been ended, whereas when the contents of the finishing report represent that the job ID is of the print/storage type print job data, the page number of the page the expansion processing on which has been ended and that the page is the last page, the print control portion 130 causes the touch panel 190 to keep the file name of the print job data corresponding to the job ID unchanged and to update the state thereof to "expansion has been done".

Further, when the job ID included in the finishing report received from the expansion portion 140 is the ID of the storage type print job data (step S300:NO, step S400:YES, step S405:NO, step S440:NO), the print control portion 130, according to the contents of the finishing report, causes the touch panel 190 to update the display corresponding to the print job data of the corresponding job ID (step S450) and at the same time, executes the processing of step S430 where the print control portion 130 checks whether there is a finishing advice of the print type print job data waiting for the processing in the hold queue 145b of the expansion queue 145 and the following steps. The processing in step S450 where the print control portion 130 causes the touch panel 190 to update the display is processing where, for example, when the contents of the finishing report represent that the job ID is of the storage type print job data, the page number (e.g. a first page, a second page and so on) of the page analysis processing on which has been ended and that the page is not the last page, the print control portion 130 causes the touch panel 190 to display the file name of the print job data corresponding to the job ID and the state thereof ("under expansion", here) as well as the number of pages the expansion processing on which has been ended, whereas when the contents of the finishing report represent that the job ID is of the print/storage type print job data, the page number of the page the expansion processing on which has been ended and that the page is the last page, the print control portion 130 causes the touch panel 190 to keep the file name of the print job data corresponding to the job ID unchanged and to update the state thereof to "expansion has been done".

Though not shown in FIG. 9, the print control portion 30 deletes the page analyzed data corresponding to the job ID from the storage portion 118 when the finishing report from the expansion portion 140 represents that the expansion processing on the last page has been ended.

Though the operation of the print control portion 130 in the case where it receives the finishing advice from the page analysis control portion 120 (step S300:YES) and in the case where it receives the finishing report from the expansion portion 140 (step S300:NO, step S400:YES) has been described above, operation of the print control portion 130 in the case where the user makes an instruction by way of the touch panel 190 (step S300:NO, step S400:NO) will be described next.

Figure 10:
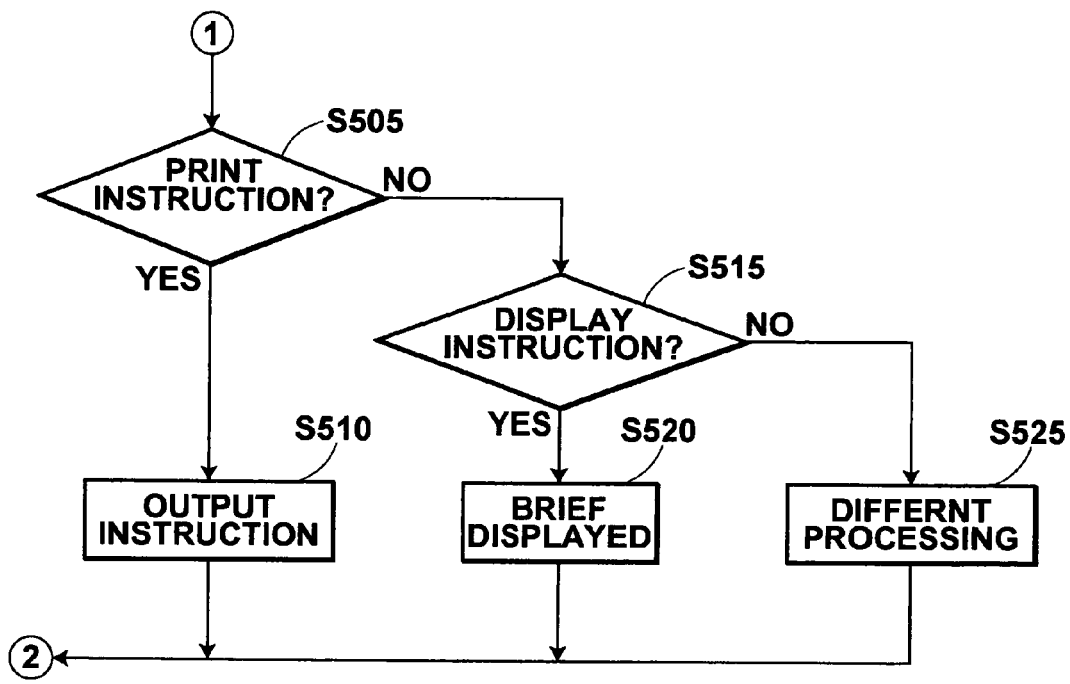
FIG. 10 is the other part of the flow chart for illustrating operation of the print control portion of the printer shown in FIG. 7.

When the user makes an instruction by way of the touch panel 190 (step S300:NO, step S400:NO), the print control portion 130 executes the control action according to the instruction of the user (the processing indicated at ① in FIG. 9 or 10). As shown in FIG. 10, when the user makes by way of the touch panel 190 an instruction to print given print data in the table A displayed by the touch panel 190 (that is, print/storage type or storage type print data stored in the hard disc 128 of the memory portion 126) (step S300:NO, step S400:NO, step S505:YES), the print control portion 130 instructs the memory portion 126 to output the instructed print data to the print engine 195 (step S510), and when the user makes by way of the touch panel 190 an instruction to display a brief of given print data in the table A displayed by the touch panel 190 (step S300:NO, step S400:NO, step S505:NO, step S515:

YES), the print control portion 130 causes the touch panel 190 to display a brief such as the total number of the pages of the instructed print data referring to the corresponding print data stored in the hard disc 128 of the memory portion 126 (step S520). When the user makes by way of the touch panel 190 a different instruction (e.g., to delete print data stored in the hard disc 128) (step S300:NO, step S400:NO, step S505: NO, step S515:NO), the print control portion 130 executes the processing according to the instruction of the user (step S525).

Further, in step S510, the memory portion 126 outputs the corresponding print data to the print engine 195 according to the output instruction from the print control portion 130.

The print engine 195 generates printings on the basis of the print data output from the expansion portion 140 (the print data of the print type print job data output from the expansion portion 140 in step S325 or S320 shown in FIG. 9) or the print data output from the memory portion 126 (the print data of the print/storage type or storage type print job data output from the memory portion 126 in step S510 shown in FIG. 10).

As described above, in the printer 200 in the print system B shown in FIG. 6, as in the printer 100 in the print system A shown in FIG. 1, when the print type print job data is received during the page analysis processing on the storage type print job data by the page analysis portion 125, the executing page analysis processing is once interrupted and the page analysis on the received print type print job data is executed prior to the executing page analysis processing, the interrupted page analysis processing on the storage type print job data is resumed in parallel to the expansion processing on the print type print job data by the expansion portion 40 after the page analysis processing thereon, whereby the print type print job data is preferentially processed, and the demand that printings can be quickly obtained of the user who has sent the print type print job data can be met and at the same time the user who has sent the storage type print job data can quickly confirm whether the storage type print job data can be regularly received by the printer and the number of pages received by the printer.

Further, in the print system B of this embodiment, when a finishing advice representing that the page analysis processing on the print type print job data is ended is received during the expansion processing on the storage type print job data by the expansion portion 140, the executing expansion processing is once interrupted and the expansion processing on the received print type print job data is executed prior to the executing expansion processing, whereby printings of the user who has sent the print type print job data can be more quickly obtained.

The present invention need not be limited to the illustrated embodiments, but may be variously changed within the scope of the invention.

For example, though, in the printer 100 or 200 in the embodiments described above, the page analysis processing and the expansion processing are executed in parallel by multitasking of one CPU of the priority system, multitasking of round robin system may be adopted in place of the multitasking of the priority system so long as the page analysis processing and the expansion processing can be executed in parallel. Further, separate CPUs may be respectively used as the page analysis means for executing the page analysis processing and the expansion means for executing the expansion processing.

Further, the result of the page analysis of the storage type print job data obtained by the page analysis processing need not be displayed on the panel but may be, for example, returned to the personal computer which transmits the corresponding print job data.

Further, though, in the printer 100 or 200 in the embodiments described above, the print instruction on the stored page analyzed data or the stored print data is made by way of the touch panel inherent to the printer, the print instruction may be made by way of the personal computer on the network.

Further, though, in the printer 200 in the embodiment described above, the timing at which the print control portion 130 deletes page analyzed data of given print job data from the storage portion 118 is governed by the timing at which the print control portion 130 receives from the expansion portion 140 the finishing report representing that the expansion processing on the last page of the print job data has been ended, the print control portion 130 may deletes the page analyzed data at any timing after the expansion processing on the last page of the print job data. For example, while the print engine 195 transmits the finishing report to the print control portion 130 when printing has been regularly ended, and the memory portion 126 transmits the finishing report to the print control portion when storage has been regularly ended, the print control portion 130 may execute the deleting processing on the print-only type print job data at the timing at which it receives the finishing report on the last page from the print engine 195, on the storage type print job data at the timing at which it receives the finishing report on the last page from the memory portion 126, and on the print/storage type print job data at the timing at which it receives the finishing report on the last page both from the memory portion 126 and the print engine 195.

Further, the present invention may be applied not only to the printer device which can deal with three types of print job data, print-only type, print/storage type and storage type but also to the printer device which can deal with only two types of print job data, print-only type and storage type or to the printer device which can deal with only two types of print job data, print/storage type and storage type.

What is claimed is:

1. A printer device, comprising:
a receiving means which receives a print type print job data including a print instruction and a storage type print job data including a storage instruction to store the print job to a storage means;
a job-type determining means which determines whether the print job data received by the receiving means is the print type print job data or the storage type print job data;
a page analysis means which executes page analysis on the print job data to make page analyzed print job data;
a page analysis output means which outputs result of the page analysis processing on the storage type print job data;
a storage means which stores the page analyzed print job data of the storage type print job data;
an expansion control means which causes expansion processing on the page analyzed print job data having a print instruction out of the page analyzed print job data stored by the storage means and on the page analyzed print job data of the print type print job data made by the page analysis means;
an expansion means which executes the expansion processing under the control of the expansion control means to obtain print data;
a printing generating means which generates printings according to the print data;

a page analysis queue which temporarily stores the print job data waiting for the page analysis processing by the page analysis means; and a page analysis control means which controls the page analysis means, wherein the improvement comprises that the page analysis control means causes the page analysis means to execute the page analysis processing preferentially on the print type print job data to the storage type print job data out of the print job data waiting for the page analysis processing stored in the page analysis queue, to interrupt, when the receiving means receives the print type print job data during the page analysis processing on the storage type print job data, the page analysis processing and execute the page analysis processing on the received print type print job data to output the page analyzed print job data to the expansion means, to cause the expansion means to execute expansion processing of print type print job data and to resume the interrupted page analysis processing on the storage type print job data in parallel with the execution of expansion processing of print type print job data after the page analysis processing on the received print type print job data.

2. A printer device as defined in claim 1, wherein
the print type print job data includes both print-only type print job data solely including a print instruction and print/storage type print job data including both the print instruction and the storage instruction;

the job-type determining means determines whether the print job data received by the receiving means is the print-only type print job data, the print/storage type print job data, or the storage type print job data;

and the storage means further stores the page analyzed data of the print/storage type print job data.

3. A printer device as defined in claim 1, wherein
the print type print job data includes both print-only type print job data solely including a print instruction and print/storage type print job data including both the print instruction and the storage instruction;

the job-type determining means determines whether the print job data received by the receiving means is the print-only type print job data, the print/storage type print job data, or the storage type print job data;

the storage means further stores the print data of the print/storage type print job data;

and the expansion control means causes print data stored by the storage means to be output directly to the printing generating means upon issue of a print instruction on the print data stored by the storage means.

4. A printer device as defined in claim 1, wherein
the expansion control means obtains the print data by causing the expansion means to execute the expansion processing only on the page analyzed data having a first print instruction out of the page analyzed print job data stored by the storage means, and causes the storage means to store the print data and to output the print data directly to the printing generating means upon issue of a print instruction on the print data subsequently stored by the storage means.

5. A printer device as defined in claim 1, wherein
the expansion control means causes the expansion means, as soon as the page analysis processing on one page of the print type print job data by the page analysis means is ended, to execute the expansion processing on the page analyzed print job data of the page.

6. A printer device as defined in claim 1, wherein
the page analysis queue is divided into a first print queue which temporarily stores the print type print job data waiting for the processing and a first hold queue which temporarily stores the storage type print job data waiting for the processing;

and the page analysis control means causes the page analysis means to execute the page analysis processing preferentially on the print job data stored in the first print queue to that stored in the first hold queue.

7. A printer device as defined in claim 1, wherein
the page analysis processing by the page analysis means and the expansion processing by the expansion means can be executed in parallel by multitasking and, when the page analysis processing and the expansion processing are to be executed in parallel, the expansion processing is executed in preference to the page analysis processing.

8. A printer device, comprising:
a receiving means which receives a print type print job data including a print instruction and a storage type print job data including a storage instruction to store the print job to a storage means;

a job-type determining means which determines whether the print job data received by the receiving means is the print type print job data or the storage type print job data;

a page analysis means which executes page analysis on the print job data to make page analyzed print job data;

a page analysis output means which outputs result of the page analysis processing on the storage type print job data;

an expansion control means which causes expansion processing on the page analyzed print job data made by the page analysis means;

an expansion means which executes the expansion processing under the control of the expansion control means to obtain print data;

a storage means which stores the print data of the storage type print job data obtained by the expansion means;

a printing generating means which generates printings according to the print data having a print instruction out of the print data stored by the storage means and the print data of the print type print job data obtained by the expansion means;

a page analysis queue which temporarily stores the print job data waiting for the page analysis processing by the page analysis means; and a page analysis control means which controls the page analysis means, wherein the improvement comprises that the page analysis control means causes the page analysis means to execute the page analysis processing preferentially on the print type print job data to the storage type print job data out of the print job data waiting for the page analysis processing stored in the page analysis queue, and to interrupt, when the receiving means receives the print type print job data during the page analysis processing on the storage type print job data, the page analysis processing and to execute the page analysis processing on the received print type print job data to output the page analyzed print job data to the expansion means, to cause the expansion means to execute expansion processing of print type print job data and to resume the interrupted page analysis processing on the storage type print job data in parallel with the execution of expansion processing of print type print job data after the page analysis processing on the received print type print job data.

9. A printer device as defined in claim 8, wherein the print type print job data includes both print-only type print job data solely including a print instruction and print/storage type print job data including both the print instruction and the storage instruction;

the job-type determining means determines whether the print job data received by the receiving means is the print-only type print job data, the print/storage type print job data, or the storage type print job data;

and the storage means further stores the print data of the print/storage type print job data.

10. A printer device as defined in claim 8, further comprising:

an expansion queue which temporarily stores the page analyzed data waiting for the expansion processing by the expansion means and in which the expansion control means causes the expansion means to execute the expansion processing preferentially on the page analyzed data of the print type print job data to that of the storage type print job data out of the page analyzed data waiting for the processing stored in the expansion queue, and to interrupt, when the page analysis means ends the page analysis processing on the print type print job data during the expansion processing by the expansion means on the page analyzed data of the storage type print job data, the expansion processing and to execute the expansion processing on the page analyzed data of the print type print job data the page analysis processing on which is ended to output the print data to the printing generating means and to resume the interrupted expansion processing on the page analyzed data of the storage type print job data after the expansion processing.

11. A printer device as defined in claim 10, wherein the expansion queue is divided into a second print queue which temporarily stores the page analyzed data of the print type print job data waiting for the processing and a second hold queue which temporarily stores the page analyzed data of the storage type print job data waiting for the processing, and the expansion control means causes the expansion means to execute the expansion processing preferentially on the page analyzed data stored in the second print queue to that stored in the second hold queue.

12. A printer device as defined in claim 8, wherein the expansion control means causes the expansion means, as soon as the page analysis processing on one page of the print type print job data by the page analysis means is ended, to execute the expansion processing on the page analyzed print job data of the page.

13. A printer device as defined in claim 8, wherein the page analysis queue is divided into a first print queue which temporarily stores the print type print job data waiting for the processing and a first hold queue which temporarily stores the storage type print job data waiting for the processing, and the page analysis control means causes the page analysis means to execute the page analysis processing preferentially on the print job data stored in the first print queue to that stored in the first hold queue.

14. A printer device as defined in claim 8, wherein the page analysis processing by the page analysis means and the expansion processing by the expansion means can be executed in parallel by multitasking and, when the page analysis processing and the expansion processing are to be executed in parallel, the expansion processing is executed in preference to the page analysis processing.

* * * * *